(12) United States Patent
Sudo

(10) Patent No.: US 11,862,197 B2
(45) Date of Patent: Jan. 2, 2024

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Daisuke Sudo, Kawasaki Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 17/885,220

(22) Filed: Aug. 10, 2022

(65) Prior Publication Data
US 2023/0245683 A1    Aug. 3, 2023

(30) Foreign Application Priority Data
Jan. 28, 2022  (JP) ................................ 2022-012108

(51) Int. Cl.
*G11B 21/10*  (2006.01)
(52) U.S. Cl.
CPC .................. *G11B 21/106* (2013.01)
(58) Field of Classification Search
None
See application file for complete search history.

(56) References Cited

U.S. PATENT DOCUMENTS

| | | | | |
|---|---|---|---|---|
| 5,901,009 | A * | 5/1999 | Sri-Jayantha | G11B 5/5547 360/78.07 |
| 6,560,059 | B1 * | 5/2003 | Hsin | G11B 5/556 360/78.04 |
| 7,126,785 | B1 * | 10/2006 | Li | G11B 5/5552 |
| 7,208,898 | B2 | 4/2007 | Stoecker et al. | |
| 7,289,291 | B1 * | 10/2007 | Schlumberger | G11B 5/5547 360/97.12 |
| 8,780,479 | B1 * | 7/2014 | Helmick | G11B 5/5547 360/78.04 |
| 10,014,018 | B1 | 7/2018 | Kiyonaga et al. | |
| 10,049,691 | B1 | 8/2018 | Gaertner et al. | |
| 2003/0067710 | A1 * | 4/2003 | Kovinskaya | G11B 5/5547 360/78.09 |
| 2003/0189784 | A1 * | 10/2003 | Galloway | G11B 5/5526 |
| 2004/0233569 | A1 * | 11/2004 | Chung | G11B 5/5547 |
| 2021/0096764 | A1 * | 4/2021 | Calfee | G06F 3/0604 |
| 2023/0245683 | A1 * | 8/2023 | Sudo | G11B 21/106 360/77.04 |

\* cited by examiner

*Primary Examiner* — Peter Vincent Agustin
(74) *Attorney, Agent, or Firm* — Kim & Stewart LLP

(57) ABSTRACT

According to one embodiment, a magnetic disk device which includes two or more independently drivable actuator blocks and performs seek control with a low jerk in which a jerk that is a derivative of acceleration is limited, wherein in a state where a first actuator block is not accessing a data sector of a disk, a second actuator block that is not the first actuator block accesses the data sector of the disk by seek control with a high Jerk.

11 Claims, 16 Drawing Sheets

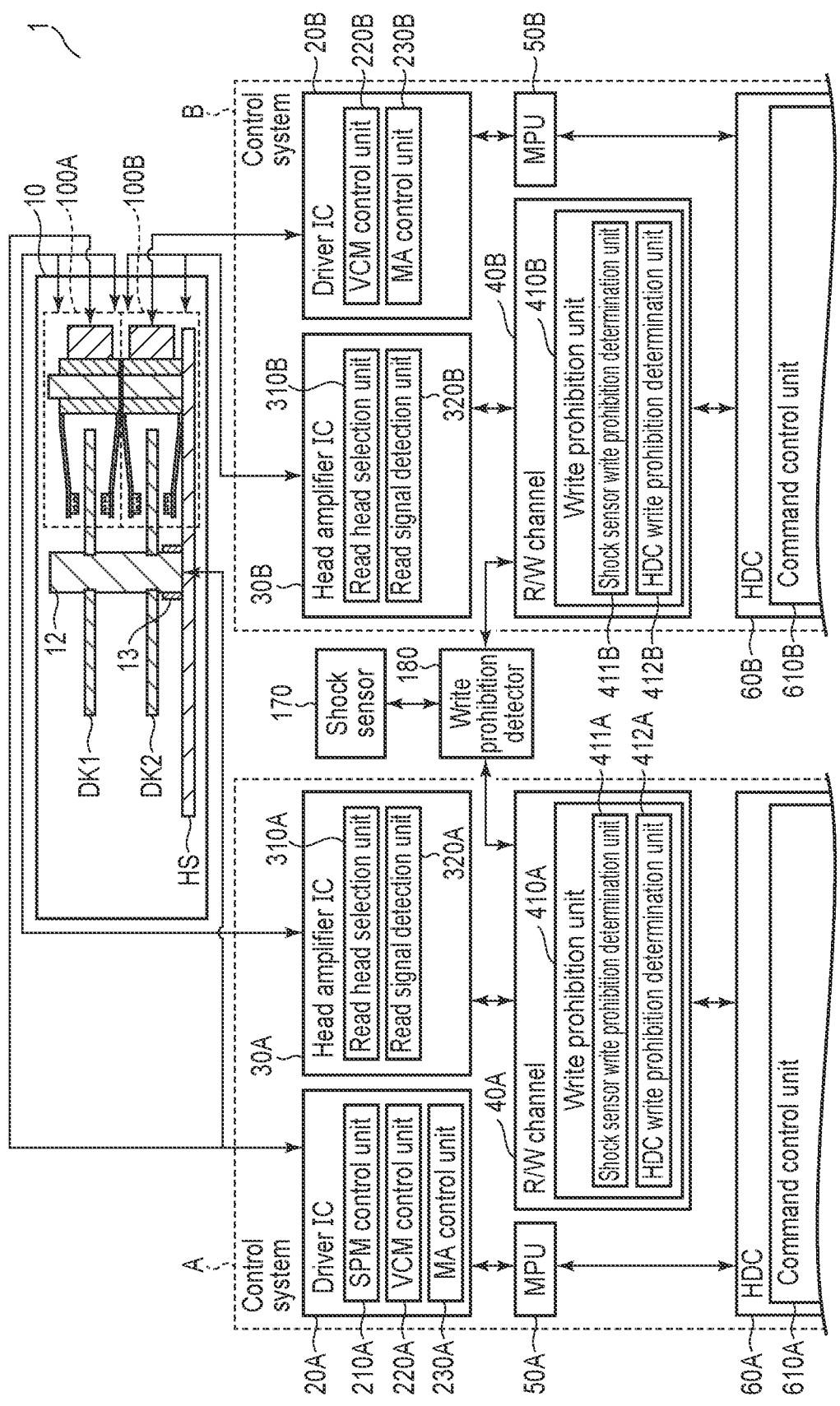
F I G. 1A

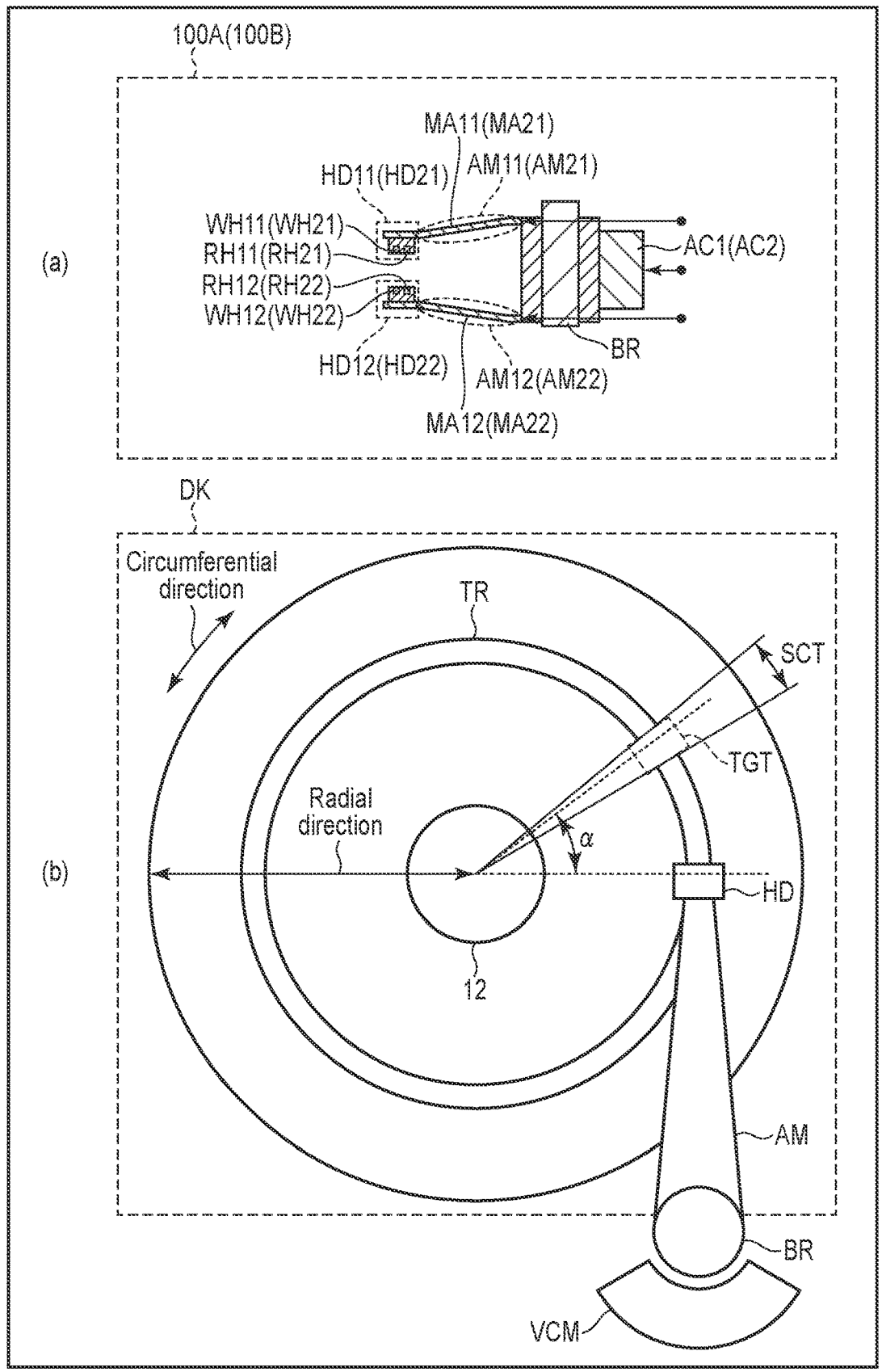
F I G. 2

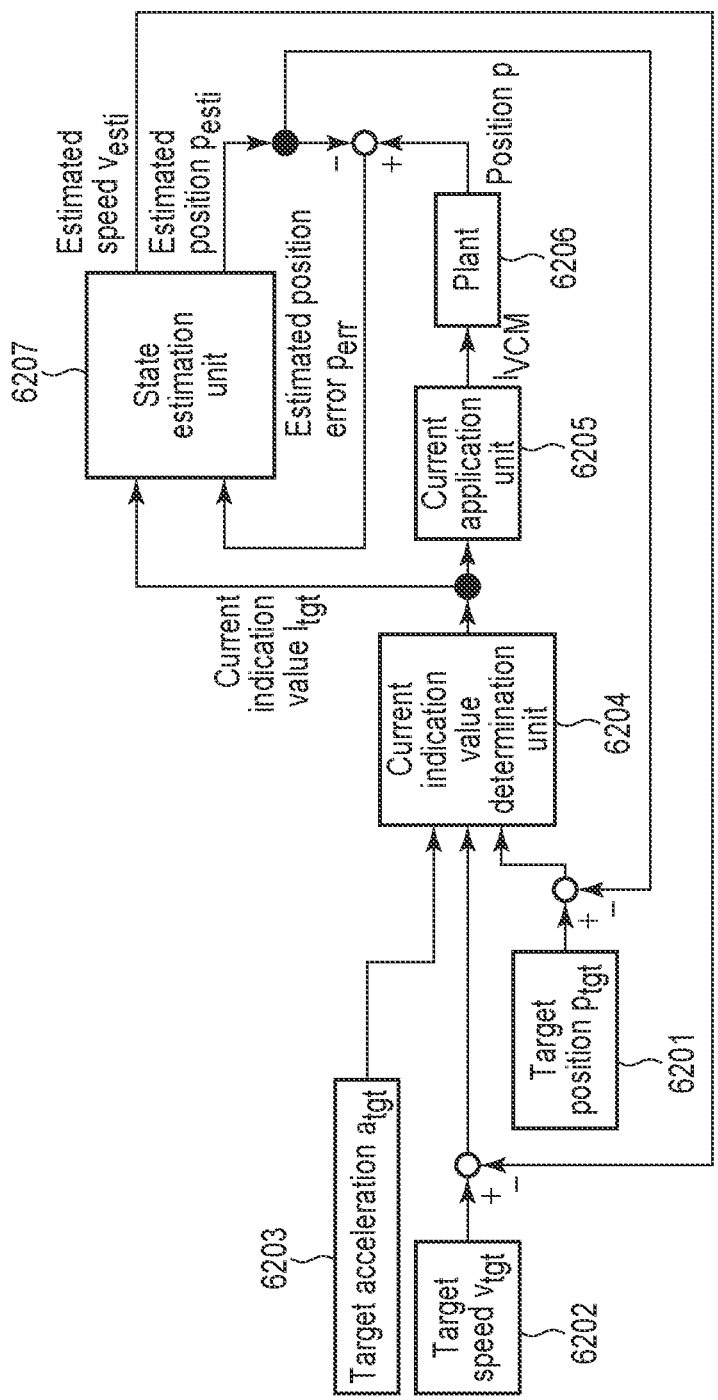
F I G. 3

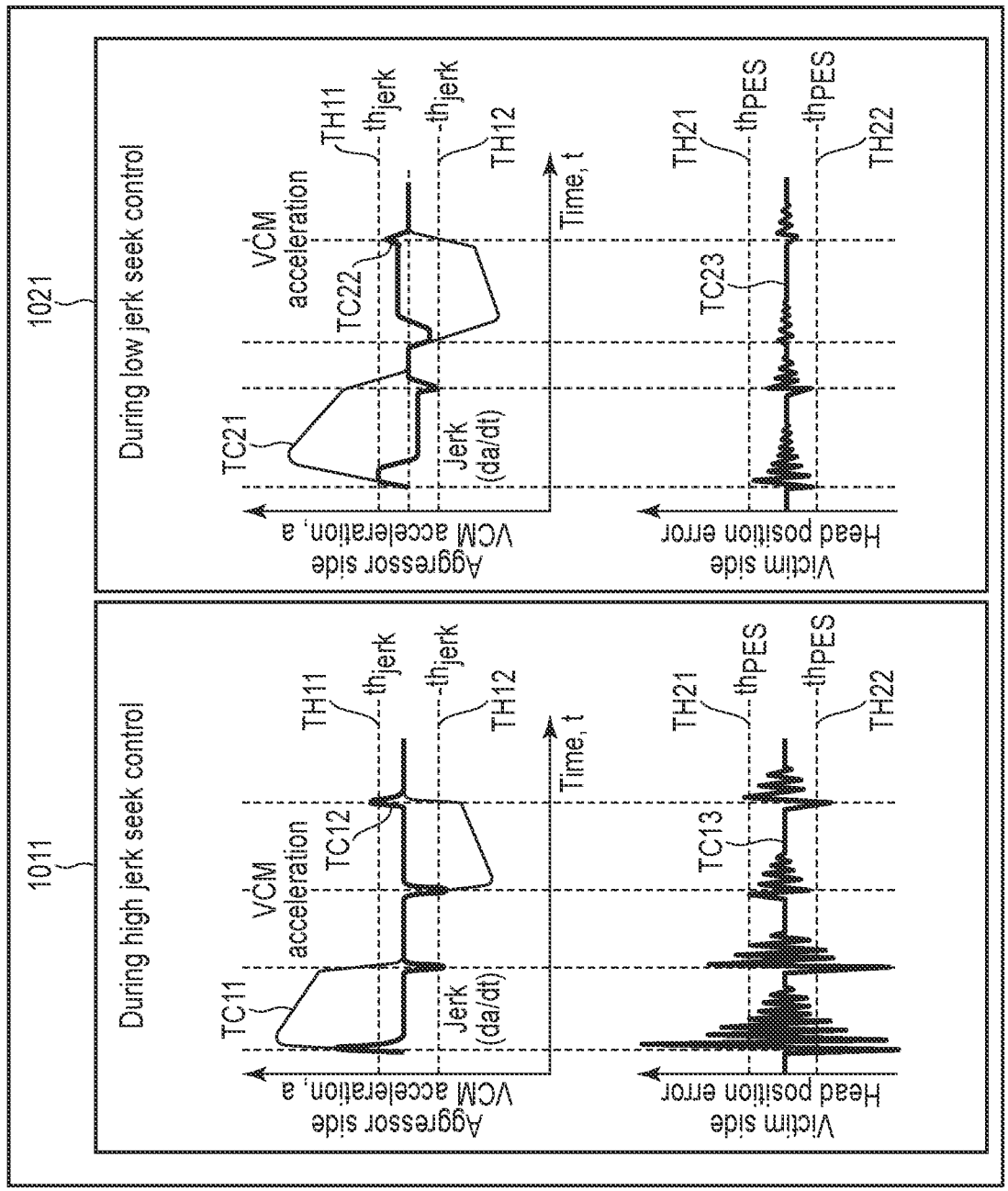
F I G. 4

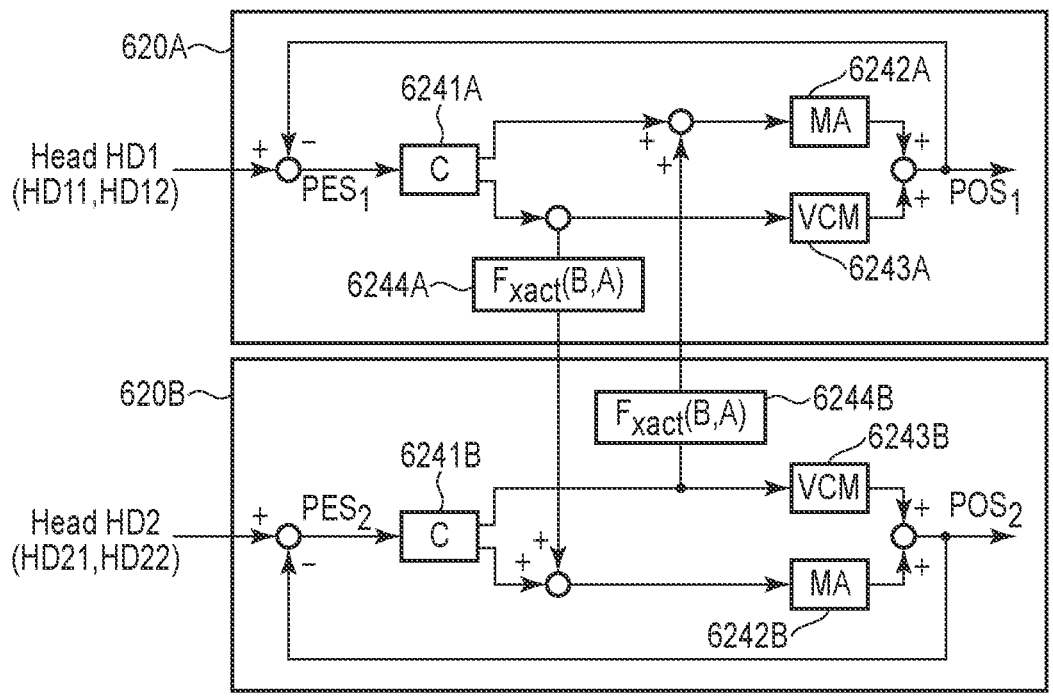
F I G. 5
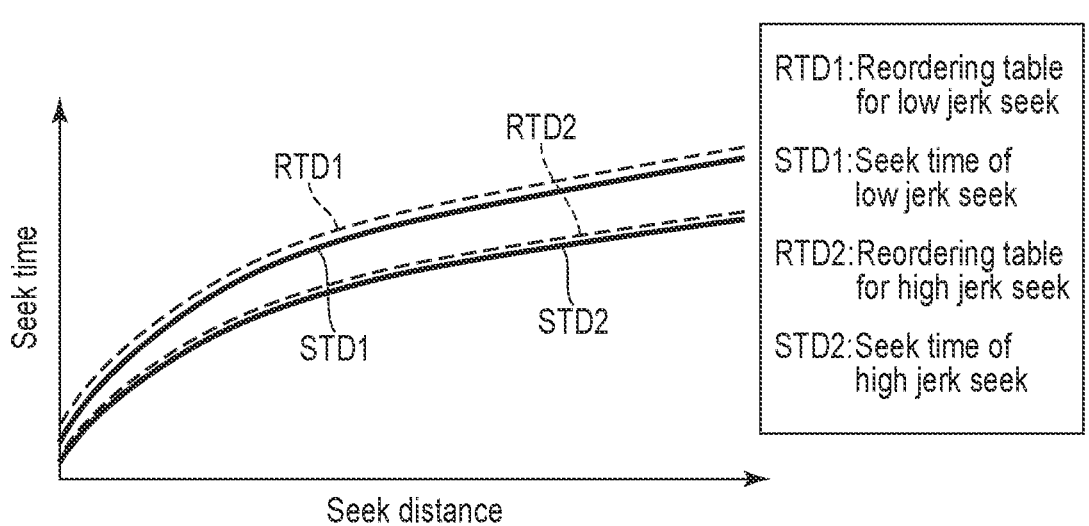
F I G. 6

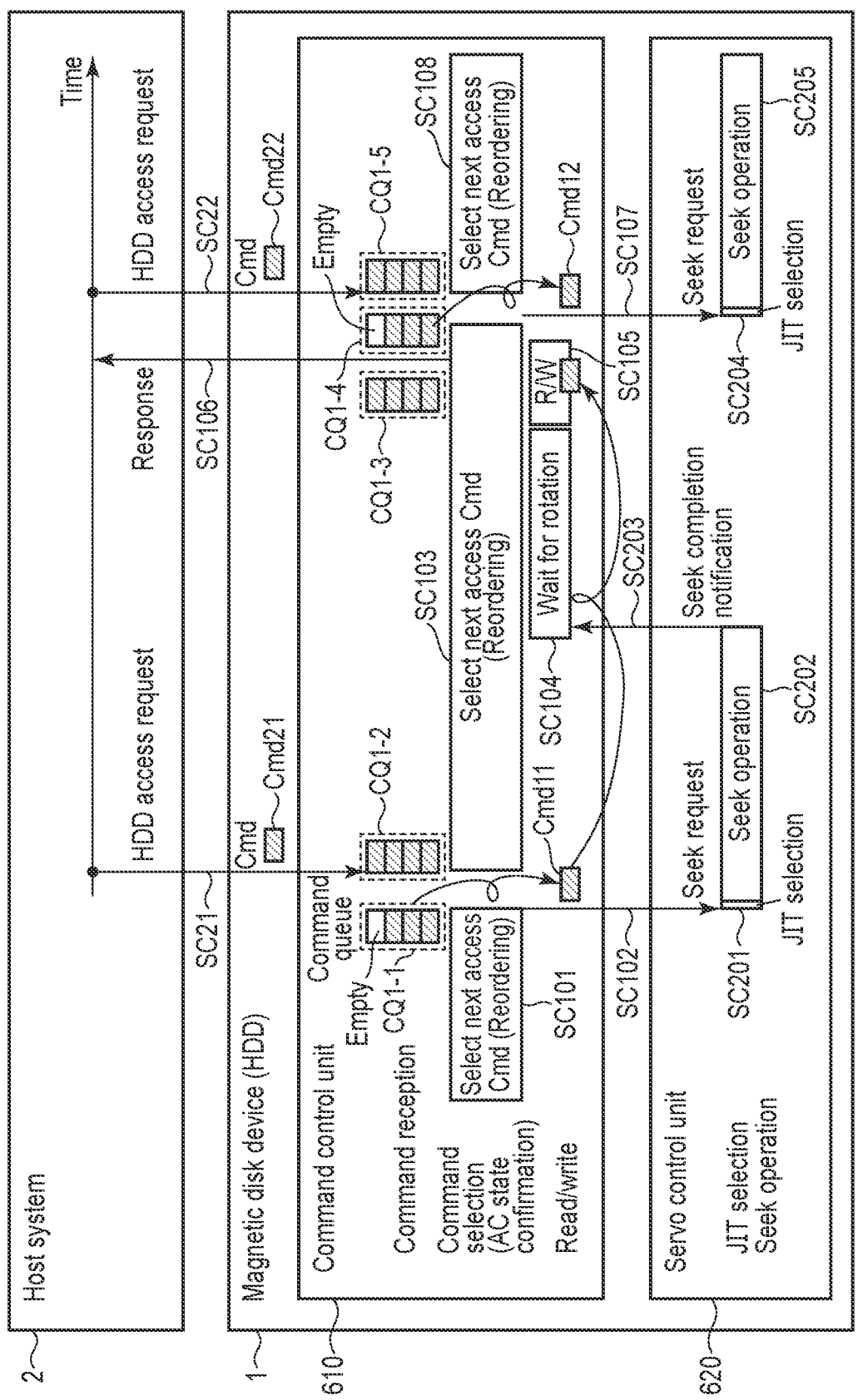
F I G. 7

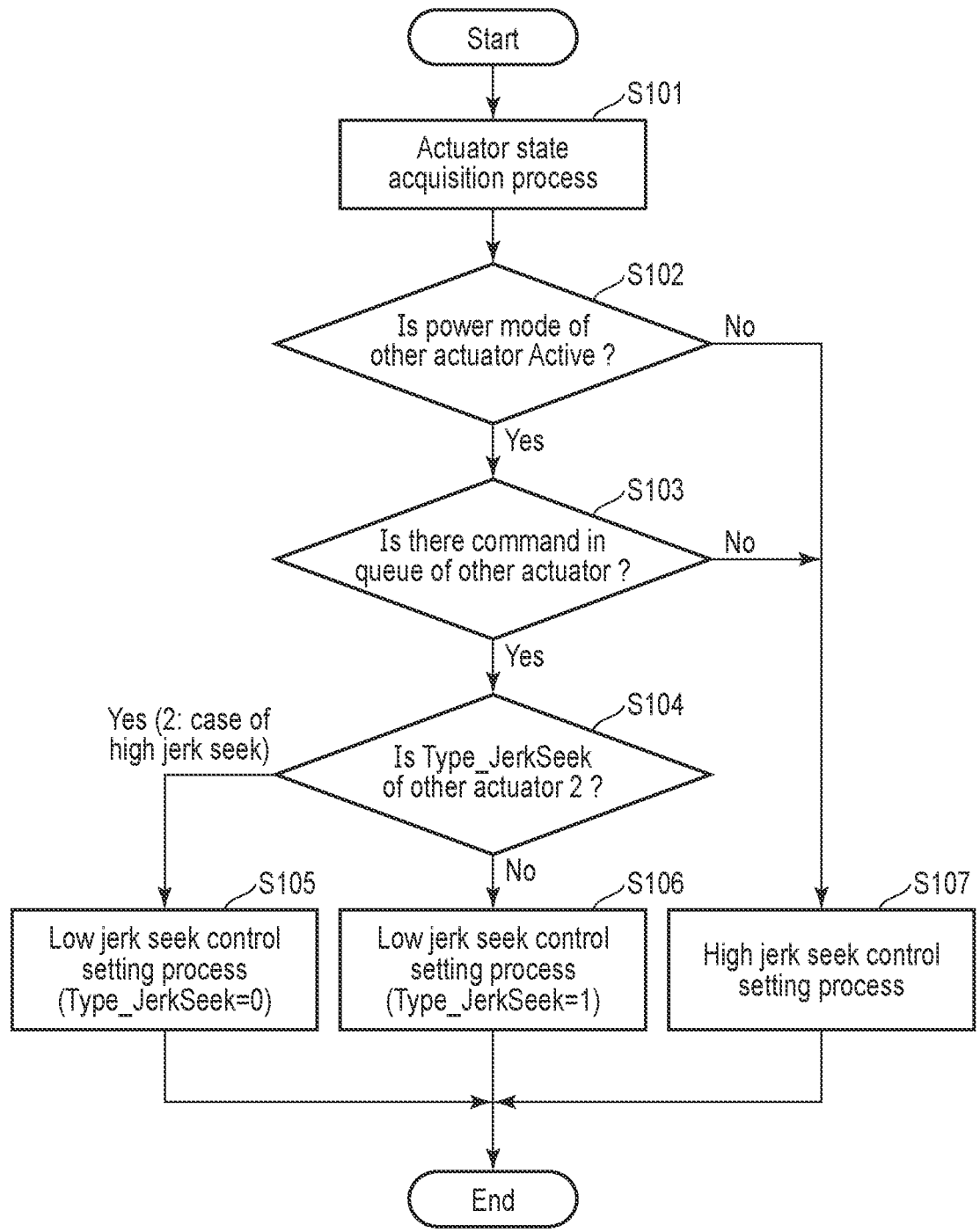
F I G. 9

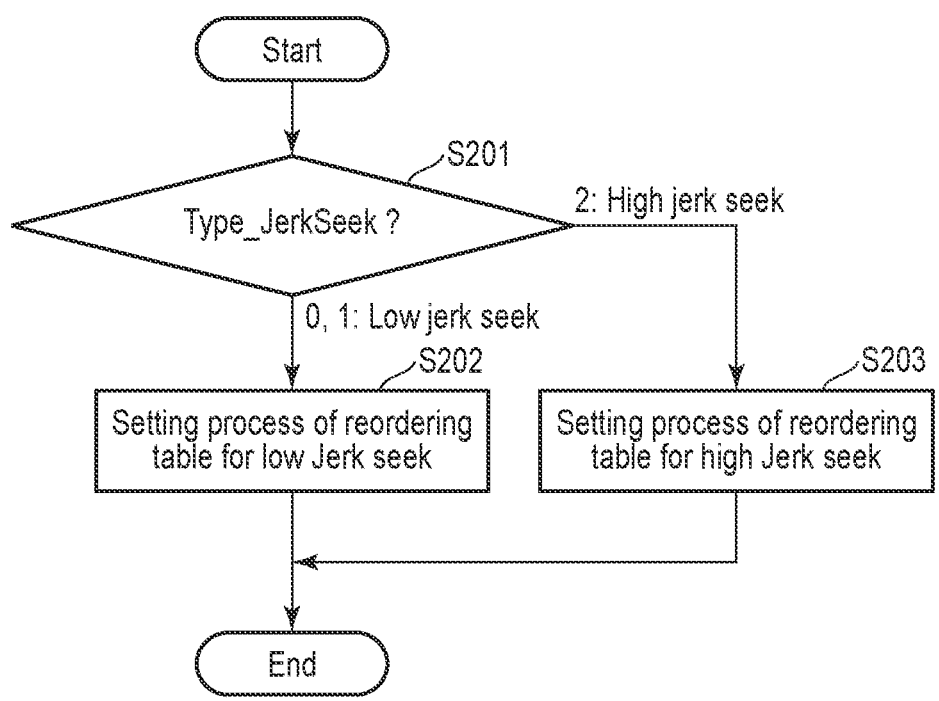
F I G. 10

|  | | Operation of other actuator block at time of determining operation of actuator block of interest | |
|---|---|---|---|
|  | | During high jerk seek | Others |
| Whether to select operation of actuator block of interest | Tracking control | Available | Available |
| | Data read/write | Unavailable | Available |
| | Low jerk control | Available | Available |
| | High jerk control | Unavailable | Available |

STT1　　STT2

F I G. 13B

MAGNETIC DISK DEVICE

CROSS-REFERENCE TO RELATED APPLICATIONS

This application is based upon and claims the benefit of priority from Japanese Patent Application No. 2022-012108, filed Jan. 28, 2022, the entire contents of which are incorporated herein by reference.

FIELD

Embodiments described herein relate generally to a magnetic disk device.

BACKGROUND

A multi-actuator magnetic disk device includes a plurality of actuators that can be independently driven. When any actuator performs a seek operation, vibration of another actuator is excited, a tracking head is shaken, and a position error PES with respect to a target position of a tracking head may increase. Therefore, control is performed to limit a jerk (the derivative of acceleration) at the time of seeking of the actuator.

However, when the jerk is limited, a seek time is delayed, and a command access performance (the number of commands that can be accessed per unit time) may be deteriorated.

An object of the present invention is to provide a magnetic disk device that improves a performance of a multi-actuator.

BRIEF DESCRIPTION OF THE DRAWINGS

FIGS. 1A and 1B are configuration diagrams of a magnetic disk device according to an embodiment.

FIG. 2 is schematic diagram of a configuration of an actuator block, a disk, and the like according to the embodiment.

FIG. 3 is a block diagram illustrating a functional configuration of a servo control unit of the magnetic disk device according to the embodiment.

FIG. 4 is a diagram illustrating an example of an influence on another actuator at the time of actuator activation of the magnetic disk device according to the embodiment.

FIG. 5 is a diagram illustrating a flow of data in a function of suppressing an influence of vibration interference between actuators in the magnetic disk device according to the embodiment.

FIG. 6 is a diagram illustrating a reordering table according to the embodiment.

FIG. 7 is a timing chart in which the magnetic disk device according to the embodiment executes a seek operation.

FIG. 9 is a flowchart in which the magnetic disk device according to the embodiment sets the type of jerk seek control.

FIG. 10 is a flowchart in which the magnetic disk device according to the embodiment sets a type of the reordering table.

FIG. 13B is a diagram illustrating a relationship between operation states of two control systems of the magnetic disk device according to the embodiment.

DETAILED DESCRIPTION

In general, according to one embodiment, a magnetic disk device which includes two or more independently drivable actuator blocks and performs seek control with a low jerk in which a jerk that is a derivative of acceleration is limited, wherein in a state where a first actuator block is not accessing a data sector of a disk, a second actuator block that is not the first actuator block accesses the data sector of the disk by seek control with a high Jerk.

Hereinafter, an embodiment of the present invention will be described with reference to the drawings.

Embodiment

In the present embodiment, an example of seek control for improving a command access performance of a magnetic disk device including two actuators will be described. The command access performance may be the number of commands that can be processed in a unit time.

For example, when one actuator (actuator A) performs a seek operation, vibration of the other actuator (actuator B) is excited, and the tracking head of the actuator B is shaken. As a result, a position error PES (position error signal) with respect to the target position of the tracking head of the actuator B increases, and there is a possibility that an error occurs in reading and writing for a data sector. Therefore, by limiting the jerk at the time of seeking of the actuator A, it is possible to reduce the shake of the tracking head of the actuator B and read and write the data sector. However, when the jerk is limited, a seek time is delayed, and the command access performance of the actuator A is deteriorated. In the present embodiment, an example of seek control for improving the command access performance in the above-described situation will be described.

Figure 1B:
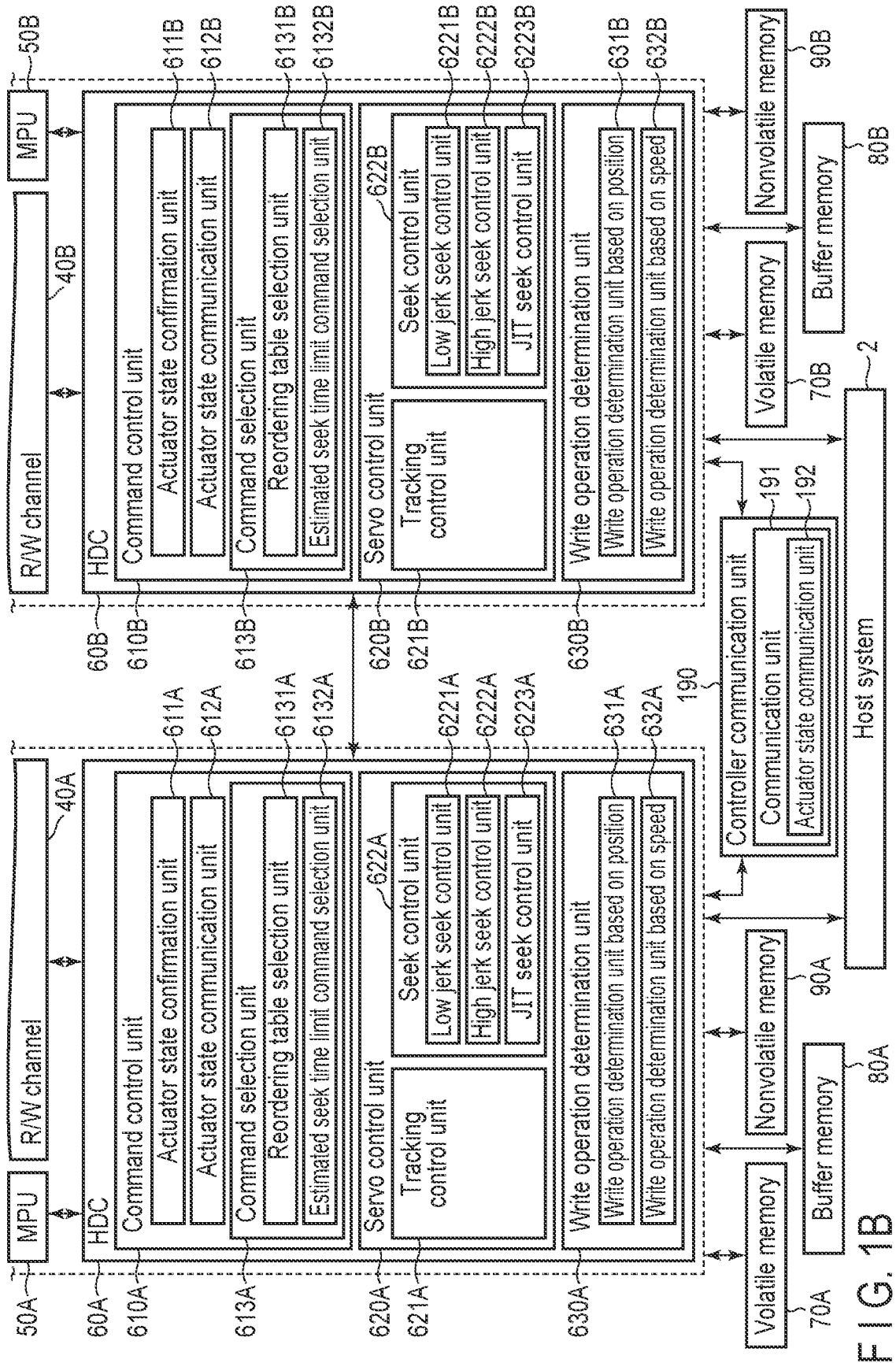

FIGS. 1A and 1B are configuration diagrams of the magnetic disk device according to the embodiment.

A magnetic disk device 1 is, for example, a hard disk drive (HDD), and is a multi-actuator magnetic disk device including two actuator block 100A and actuator block 100B.

The magnetic disk device 1 of the present embodiment includes two control systems A and B. The control system A controls the actuator block 100A and controls access to the disk DK1. The control system B controls the actuator block 100B and controls access to the disk DK2. The control system A and the control system B can perform data communication. In the functions of the control systems A and B, the functional blocks having the same names are distinguished by adding A and B to reference signs.

A HDA 10 is a head disk assembly, and a plurality of disks, a plurality of actuator blocks, a spindle, and the like are stored in a housing. The HDA 10 includes at least two or more actuator blocks 100 and a disk DK for each actuator blocks 100.

A disk DK1 and a disk DK2 (when not particularly distinguished, the disks are collectively referred to as the disk DK) are magnetic disks that are controlled by the control systems A and B, respectively, and store data.

A spindle 12 is a support of the disk DK1 and the disk DK2, and is installed in the housing HS or the like.

A spindle motor (SPM) 13 is attached with the spindle 12 and rotates the spindle 12.

The actuator block 100A and the actuator block 100B (when not particularly distinguished, the actuator blocks are collectively referred to as the actuator block 100) are controlled by the control systems A and B, respectively, and read and write data from and to the different disks DK1 and DK2.

FIG. 2 is schematic diagram of configurations of the actuator block, the disk, and the like according to the embodiment.

FIG. 2 part (a) is the schematic diagram of the actuator block 100 (the actuator block 100A or the actuator block 100B). In a case where the actuator block 100A and the actuator block 100B have the same name of components, the components of the actuator block 100A and the actuator block B are similar to each other, and thus, the reference sign number of the actuator block 100B is shown in parentheses following the reference sign number of the actuator block A.

An actuator AC1 is controlled by the control system A, is a voice coil motor (VCM) type actuator, and is attached to a coaxial BR.

An actuator AC2 functions in the control system B in the same manner as the actuator AC1. When not particularly distinguished, the actuator AC1 and the actuator AC2 are collectively referred to as an actuator AC.

An arm AM11 and an arm AM12 (when not particularly distinguished, collectively referred to as an arm AM1) are connected to the actuator AC1 and a head HD1 to sandwich the disk DK1, and support the head HD1. The arm AM1 is controlled by the control system A.

An arm AM21 and an arm AM22 (when not particularly distinguished, collectively referred to as an arm AM2) are connected to the actuator AC2 and a head HD2 to sandwich the disk DK2, and support the head HD2. The arm AM2 is controlled by the control system B in the same manner as the arm AM1. When not particularly distinguished, the arm AM1 and the arm AM2 are collectively referred to as an arm AM.

A microactuator MA11 and a microactuator MA12 (when not particularly distinguished, collectively referred to as a microactuator MA1) are actuators that are installed to sandwich the disk DK1 between suspensions (not illustrated) of the arm AM11 and the arm AM12, are controlled by the control system A, and control a head HD11 and a head HD12, respectively. More specifically, the microactuator MA1 more finely controls the operation of the head HD1 in a radial direction of the disk DK1 than the control of the operation of the head HD1 in the radial direction by the voice coil motor VCM. The microactuator MA1 may be driven independently of the VCM.

A microactuator MA21 and a microactuator MA22 (when not particularly distinguished, collectively referred to as a microactuator MA2) are controlled by the control system B in the same manner as the microactuator MA1. When not particularly distinguished, the microactuator MA1 and the microactuator MA2 are collectively referred to as a microactuator MA.

The head HD11 and the head HD12 (when not particularly distinguished, collectively referred to as a head HD1) are installed to sandwich the disk DK1 at the distal ends of the arm AM11 and the arm AM12, respectively. The head HD11 and the head HD12 are controlled by the control system A, and read and write data of the upper surface and the lower surface of the disk DK1, respectively.

A head HD21 and a head HD22 (when not particularly distinguished, collectively referred to as a head HD2) are installed to sandwich the disk DK2 at the distal ends of the arms AM21 and AM22, respectively. The head HD2 is controlled by the control system B in the same manner as the head HD1. When not particularly distinguished, the head HD1 and the head HD2 are collectively referred to as a head HD.

Each head HD is attached to a slider (not illustrated) attached to the suspension of the arm AM. The head HD is selected and operated by a head selection unit (also referred to as a read head selection unit 310) to be described later.

A time during which the DK moves by a rotation angle α (in a case where the rotation direction of the DK is clockwise) so that a target data sector TGT moves to the position of the head HD is referred to as a rotation time, and in particular, the rotation time after the head HD seeks to the track (referred to as a target track) having the target data sector TGT is referred to as a rotation waiting time. More specifically, when the SPM angle (or a servo sector number or the like) at the position on the disk where the head HD is currently present is α1 and the SPM angle (or a servo sector number or the like) of the target sector TGT is α2, the time required for the rotation of the SPM angle difference α (or a servo sector number or the like) between α1 and α2 corresponds to the rotation time or the rotation waiting time. In addition, a time from the start of the seek of the head HD to the arrival at the target data sector TGT is referred to as a command access time.

When the head HD reaches the target track by the seek, in a case where the target data sector TGT has passed the position of the head HD in the rotation direction of the disk DK, the head HD waits for the target data sector TGT by the rotation of the disk DK. In this case, the command access time is obtained by adding the rotation time corresponding to the number of additional rotations or the rotation waiting time to the time for seeking from the current head position to the target data sector TGT. In basic command reordering, a command having the shortest time among these command access times is selected.

The head HD includes a write head WH which writes data to the disk DK and a read head RH which reads data written to the disk DK. Hereinafter, a process of writing data to the disk DK may be referred to as a write process, and a process of reading data from the disk DK may be referred to as a read process. In addition, recording data in a predetermined recording region, reading data from a predetermined recording region, arranging the head HD at a predetermined position of the disk DK, writing data in a predetermined region of the disk DK, reading data from a predetermined region of the disk DK, and the like may be referred to as accessing.

A read head RH11 and a read head RH12 (when not particularly distinguished, collectively referred to as a read head RH1) are installed in the head HD1. The read head RH11 and the read head RH12 are controlled by the control system A, and read data from the upper surface and the lower surface of the disk DK1, respectively.

A read head RH21 and a read head RH22 (when not particularly distinguished, collectively referred to as a read head RH2) are installed in the head HD2 and controlled by the control system B in the same manner as the read head RH1. When not particularly distinguished, the read head RH1 and the read head RH2 are collectively referred to as a read head RH.

A write head WH11 and a write head WH12 (when not particularly distinguished, collectively referred to as a write head WH1) are installed in the head HD1. The write head WH11 and the write head WH12 are controlled by the control system A, and write data on the upper surface and the lower surface of the disk DK1.

A write head WH21 and a write head WH22 (when not particularly distinguished, collectively referred to as a write head WH2) are installed in the head HD2 and controlled by the control system B in the same manner as the write head WH1. When not particularly distinguished, the write head WH1 and the write head WH2 are collectively referred to as a write head WH.

FIG. 2 part (b) is a schematic diagram of the disk DK. The disk DK is a general magnetic disk, and a detailed description thereof will be omitted.

The disk DK is, for example, a disk-type magnetic disk, and is a medium to which data is written by magnetism. The disk DK is attached to the spindle 12 and rotates by driving of the SPM 13. A direction along the circumference of (the upper surface and the lower surface of) the disk DK is referred to as a circumferential direction, and a direction orthogonal to the circumferential direction of (the upper surface and the lower surface of) the disk DK is referred to as a radial direction.

The disk DK is divided into a plurality of regions called tracks in the radial direction (or concentrically) around the spindle 12. In addition, the disk DK is divided into a plurality of regions called sectors in the circumferential direction. FIG. 2 part (b) is an example in which a track TR and a sector SCT are illustrated one by one, and the target data sector TGT is illustrated in the sector SCT on the track TR.

In the seek control, the arm AM or the like of the actuator block 100 is moved to move the head HD onto the track TR, and then the head HD is moved onto the target data sector TGT by the rotation of the disk DK. Thereafter, tracking control is performed by the microactuator MA or the like. The tracking control is a general technique, and details are not described.

Returning to FIGS. 1A and 1B, a driver IC 20A is a function of the control system A, and controls each function of the HDA 10 according to control from a MPU 50A, a HDC 60A, or the like.

A driver IC 20B functions in the control system B in the same manner as the driver IC 20A. When not particularly distinguished, the driver IC 20A and the driver IC 20B are collectively referred to as a driver IC 20.

Note that in the driver IC 20, the microactuator MA may not be provided, and in this case, an MA control unit 230 may not be provided.

An SPM control unit 210A is a function shared by the control systems A and B, and controls the rotation of the spindle motor SPM 13 of the HDA 10. The SPM control unit 210A is installed in the driver IC 20A in FIG. 1, but may be installed in the driver IC 20B.

A VCM control unit 220A controls driving of the voice coil motor (VCM) by controlling a current (or voltage) supplied to the voice coil motor which controls the actuator block 100A of the HDA 10.

A VCM control unit 220B functions in the control system B in the same manner as the VCM control unit 220A. When not particularly distinguished, the VCM control unit 220A and the VCM control unit 220B are collectively referred to as a VCM control unit 220.

A MA control unit 230A controls driving of the microactuator MA1 by controlling a current (or voltage) supplied to the microactuator MA1.

A MA control unit 230B functions in the control system B in the same manner as the MA control unit 230A. When not particularly distinguished, the MA control unit 230A and the MA control unit 230B are collectively referred to as the MA control unit 230.

A head amplifier IC 30A is, for example, a preamplifier, amplifies a read signal read from the disk DK1, and outputs the amplified read signal to a read/write (R/W) channel 40A. The head amplifier IC 30A is electrically connected to the head HD1 (the head HD11, the head HD12). In addition, the head amplifier IC 30A outputs a write current corresponding to a signal output from the R/W channel 40A to the head HD1.

A head amplifier IC 30B functions in the control system B in the same manner as the head amplifier IC 30A. When not particularly distinguished, the head amplifier IC 30A and the head amplifier IC 30B are collectively referred to as a head amplifier IC 30. The head amplifier IC 30 includes the read head selection unit 310 and a read signal detection unit 320.

A read head selection unit 310A selects the read head RH1 which reads data from the disk DK1.

A read head selection unit 310B functions in the control system B in the same manner as the read head selection unit 310A. When not particularly distinguished, the read head selection unit 310A and the read head selection unit 310B are collectively referred to as a read head selection unit 310.

A read signal detection unit 320A detects a signal (read signal) read from the disk DK1 by the read head RH1.

A read signal detection unit 320B functions in the control system B in the same manner as the read signal detection unit 320A. When not particularly distinguished, the read signal detection unit 320A and the read signal detection unit 320B are collectively referred to as a read signal detection unit 320.

The R/W channel 40A executes signal processing of read data transferred from the disk DK1 to a host system 2 and write data transferred from the host system 2 in response to an instruction from the MPU 50A. The R/W channel 40A is electrically connected to the head amplifier IC 30A, the MPU 50A, the HDC 60A, a write prohibition detector 180, and the like.

The R/W channel 40B functions in the control system B in the same manner as the R/W channel 40A. When not particularly distinguished, the R/W channel 40A and the R/W channel 40B are collectively referred to as an R/W channel 40.

A write prohibition unit 410A designates prohibition (or stop) of write (or write operation) to the disk DK1 by the head HD1, and outputs a control signal or the like to the head amplifier IC 30A.

A write prohibition unit 410B functions in the control system B in the same manner as the write prohibition unit 410A. When not particularly distinguished, the write prohibition unit 410A and the write prohibition unit 410B are collectively referred to as a write prohibition unit 410.

In the case of receiving a write prohibition determination execution signal generated by the write prohibition detector 180, a shock sensor write prohibition determination unit 411A determines whether to prohibit (or stop) the write (or the write operation) by the head HD1 based on a vibration, an impact, or the like detected by a shock sensor 170.

For example, the shock sensor write prohibition determination unit 411A may determine whether the vibration or the impact detected by the shock sensor 170 is larger than a predetermined value or equal to or smaller than the predetermined value based on the write prohibition determination execution signal. In a case where it is determined that the vibration or the impact is larger than the predetermined value, the shock sensor write prohibition determination unit 411A determines the prohibition (or stop) of the write (or the write operation) of the head HD1. The shock sensor write prohibition determination unit 411A generates and outputs a write prohibition determination signal for prohibiting (or stopping) the write (or the write operation) of the head HD1 based on the determination result.

On the other hand, in a case where it is determined that the vibration or the impact is equal to or less than the predetermined value, the shock sensor write prohibition determination unit 411A may determine not to prohibit (or stop) the write (or the write operation) of at least one head HD1 connected to the actuator AC1.

A shock sensor write prohibition determination unit 411B functions in the control system B in the same manner as the shock sensor write prohibition determination unit 411A. When not particularly distinguished, the shock sensor write prohibition determination unit 411A and the shock sensor write prohibition determination unit 411B are collectively referred to as a shock sensor write prohibition determination unit 411.

A HDC write prohibition determination unit 412A determines whether or not to prohibit (or stop) the write (or the write operation) of the head HD1 based on the signal from the HDC 60A, and outputs a control signal to the head amplifier IC 30A based on the determination result. For example, in the case of receiving a write prohibition signal for prohibiting (or stopping) the write (or the write operation) of the head HD1 from the HDC 60A, the HDC write prohibition determination unit 412A negates (deasserts) a write gate and controls the head amplifier IC 30A to prohibit (or stop) the write (or the write operation) of the head HD1.

A HDC write prohibition determination unit 412B functions in the control system B in the same manner as the HDC write prohibition determination unit 412A. When not particularly distinguished, the HDC write prohibition determination unit 412A and the HDC write prohibition determination unit 412B are collectively referred to as an HDC write prohibition determination unit 412.

The MPU 50A is a micro processing unit (MPU), and outputs a control signal or the like to the driver IC 20A based on a signal from the HDC 60A or the like. The MPU 50A outputs a control signal for seeking the head HD1 to a predetermined position (for example, the target data sector TGT) of the disk DK1. Further, the MPU 50A outputs a signal for writing data to a predetermined sector (data sector) or reading data from a predetermined sector (data sector). For example, the MPU 50A positions the head HD1 in the target data sector TGT, and outputs a signal for writing data to a predetermined sector (target data sector TGT) or reading data from a predetermined sector (target data sector TGT).

A MPU 50B functions in the control system B in the same manner as the MPU 50A. When not particularly distinguished, the MPU 50A and the MPU 50B are collectively referred to as an MPU 50.

The HDC 60A is a hard disk controller and includes a command control unit 610A, a servo control unit 620A, and a write operation determination unit 630A. Each unit of the HDC 60A, for example, the command control unit 610A, the servo control unit 620A, the write operation determination unit 630A, and the like may be executed by a program such as firmware or software. In addition, the HDC 60A may include these units as hardware such as a circuit. In addition, a part of the configuration of the HDC 60A may be provided in the MPU 50A. The HDC 60A controls the driver IC 20A to control the actuator block 100A.

The HDC 60A controls read/write processing of data to the disk DK1 and controls data transfer between the host system 2 and the R/W channel 40A. The HDC 60A is electrically connected to, for example, the R/W channel 40A, the MPU 50A, a volatile memory 70A, a buffer memory 80A, a nonvolatile memory 90A, and the like.

A HDC 60B functions in the control system B in the same manner as the HDC 60A. When not particularly distinguished, the HDC 60A and the HDC 60B are collectively referred to as a HDC 60.

The command control unit 610A acquires the state of the actuator AC1 and selects a command stored as a command queue 1 in the buffer memory 80A. The state of the actuator AC1 includes Power Mode indicating whether the actuator is operating, the number of standby commands of the command queue 1 scheduled to be processed by the actuator AC1, and Type_JerkSeek set as an operation parameter of the actuator AC1. The state of the actuator AC1 may indicate a function of a control system (in this case, the control system A) including the actuator AC1 or a state of the actuator block 100 (in this case, 100A).

A command control unit 610B acquires the state of the actuator AC2 and selects a command stored as a command queue 2 in the buffer memory 80B. The state of the actuator AC2 includes Power Mode indicating whether the actuator is operating, the number of standby commands of the command queue 2 scheduled to be processed by the actuator AC2, and Type_JerkSeek set as an operation parameter of the actuator AC2.

The command control unit 610B functions in the control system B in the same manner as the command control unit 610A. When not particularly distinguished, the command control unit 610A and the command control unit 610B are collectively referred to as a command control unit 610.

An actuator state confirmation unit 611A confirms the state of the actuator AC2 and determines the operation mode of the actuator AC1 which is a control target of its own control system A.

An actuator state confirmation unit 611B confirms the state of the actuator AC1 and determines the operation mode of the actuator AC2 which is a control target of its own control system B.

The actuator state confirmation unit 611B functions in the control system B in the same manner as the actuator state confirmation unit 611A. When not particularly distinguished, the actuator state confirmation unit 611A and the actuator state confirmation unit 611B are collectively referred to as an actuator state confirmation unit 611.

An actuator state communication unit 612A communicates with an actuator state communication unit 612B via a controller communication unit 190 to exchange data. For example, the actuator state communication unit 612A acquires the state of the actuator AC2 which is a control target of the HDC 60B.

An actuator state communication unit 612B functions in the control system B in the same manner as the actuator state communication unit 612A. For example, the actuator state communication unit 612B acquires the state of the actuator AC1 which is a control target of the HDC 60A. When not particularly distinguished, the actuator state communication unit 612A and the actuator state communication unit 612B are collectively referred to as an actuator state communication unit 612.

A command selection unit 613A selects a command to be executed from the commands scheduled to be processed by the control system A stored in the command queue 1 in the buffer memory 80A.

A command selection unit 613B selects a command to be executed from the commands scheduled to be processed by the control system B stored in the command queue 2 in the buffer memory 80B. The command selection unit 613B functions in the control system B in the same manner as the command selection unit 613A. When not particularly distinguished, the command selection unit 613A and the command selection unit 613B are collectively referred to as a command selection unit 613.

A reordering table selection unit 6131A selects a reordering table for determining a command to be processed next among the commands stored in the command queue 1.

A reordering table selection unit 6131B selects a reordering table for determining a command to be processed next among the commands stored in the command queue 2. The reordering table selection unit 6131B functions in the control system B in the same manner as the reordering table selection unit 6131A. When not particularly distinguished, the reordering table selection unit 6131A and the reordering table selection unit 6131B are collectively referred to as a reordering table selection unit 6131.

An estimated seek time limit command selection unit 6132A confirms whether or not a command having a seek time (estimated time) longer than the end time (estimated time) of the command being processed by the actuator AC2 is in the Command queue 1. The estimated seek time limit command selection unit 6132A selects a JIT seek as the operation characteristic of a seek acceleration, for example, based on the confirmation result. The JIT seek will be described later.

The estimated seek time limit command selection unit 6132B confirms whether or not a command having a seek time (estimated time) longer than the end time (estimated time) of the command being processed by the actuator AC1 is in the Command queue 2. The estimated seek time limit command selection unit 6132B selects the JIT seek as the operation characteristic of the seek acceleration, for example, based on the confirmation result. The estimated seek time limit command selection unit 6132B functions in the control system B in the same manner as the estimated seek time limit command selection unit 6132A. When not particularly distinguished, the estimated seek time limit command selection unit 6132A and the estimated seek time limit command selection unit 6132B are collectively referred to as an estimated seek time limit command selection unit 6132.

The servo control unit 620A controls the position of the head HD1. In other words, the servo control unit 620A controls access by the head HD1 to a predetermined region (for example, the target data sector TGT) of the disk DK1. The servo control unit 620A includes a tracking control unit 621A and a seek control unit 622A.

The servo control unit 620B functions in the control system B in the same manner as the servo control unit 620A. When not particularly distinguished, the servo control unit 620A and the servo control unit 620B are collectively referred to as a servo control unit 620.

The tracking control unit 621A controls tracking of the head HD1 to a predetermined track of the disk DK1. Tracking the head HD1 to the predetermined track of the disk DK1 may be simply referred to as tracking. The tracking includes following a predetermined path (for example, the predetermined track) when writing data to the disk DK1 and following the predetermined path (for example, the predetermined track) when reading data from the disk DK1.

A tracking control unit 621B functions in the control system B in the same manner as the tracking control unit 621A. When not particularly distinguished, the tracking control unit 621A and the tracking control unit 621B are collectively referred to as a tracking control unit 621.

The seek control unit 622A performs seek control of the head HD1 to the target track in the disk DK1. The seek control unit 622A determines a seek orbit with respect to the head HD1. In addition, the seek control unit 622A switches an operation mode of the seek control by Type_JerkSeek which is a seek operation mode set by the actuator state confirmation unit 611A.

A seek control unit 622B functions in the control system B in the same manner as the seek control unit 622A. When not particularly distinguished, the seek control unit 622A and the seek control unit 622B are collectively referred to as a seek control unit 622.

A low jerk seek control unit 6221A executes seek control based on the operation characteristic of a low jerk in a case where Type_JerkSeek set by the actuator state confirmation unit 611A is 1.

A low jerk seek control unit 6221B executes seek control based on the operation characteristic of a low jerk in a case where Type_JerkSeek set by the actuator state confirmation unit 611B is 1. When not particularly distinguished, the low jerk seek control unit 6221A and the low jerk seek control unit 6221B are collectively referred to as a low jerk seek control unit 6221.

A high jerk seek control unit 6222A executes seek control based on the operation characteristic of a high jerk in a case where Type_JerkSeek set by the actuator state confirmation unit 611A is 2.

A low jerk seek control unit 6221B executes seek control based on the operation characteristic of a high jerk in a case where Type_JerkSeek set by the actuator state confirmation unit 611B is 2. When not particularly distinguished, the high jerk seek control unit 6222A and the high jerk seek control unit 6222B are collectively referred to as a high jerk seek control unit 6222.

A JIT seek control unit 6223A executes seek control based on the operation characteristic of the JIT seek in a case where Type_JerkSeek set by the actuator state confirmation unit 611A is 0.

A JIT seek control unit 6223B executes seek control based on the operation characteristic of the JIT seek in a case where Type_JerkSeek set by the actuator state confirmation unit 611B is 0. When not particularly distinguished, the JIT seek control unit 6223A and the JIT seek control unit 6223B are collectively referred to as a JIT seek control unit 6223.

A write operation determination unit 630A determines the write operation of the head HD1. The write operation determination unit 630A includes a position write operation determination unit 631A and a speed write operation determination unit 632A. The position write operation determination unit 631A determines the write operation of the head HD1 according to the position of the head HD1. The speed write operation determination unit 632A determines one write operation of the head HD according to the speed of the head HD1.

A write operation determination unit 630B functions in the control system B in the same manner as the write operation determination unit 630A. When not particularly distinguished, the write operation determination unit 630A and the write operation determination unit 630B are collectively referred to as a write operation determination unit 630.

The volatile memory 70A and the volatile memory 70B (collectively referred to as the volatile memory 70 when not particularly distinguished) are semiconductor memories in which stored data is lost when power supply is cut off. The volatile memory 70 stores data and the like required for processing in each unit of the magnetic disk device 1. The volatile memory 70 is, for example, a dynamic random access memory (DRAM) or a synchronous dynamic random access memory (SDRAM). The volatile memory 70A and the volatile memory 70B may be work memories used in processing of the control system A and the control system B, respectively.

The buffer memory 80A and the buffer memory 80B (collectively referred to as buffer memory 80 when not particularly distinguished) are semiconductor memories which temporarily record data and the like transmitted and received between the magnetic disk device 1 and the host system 2. For example, the buffer memory 80 is a buffer which temporarily stores a command received by the magnetic disk device 1 from the host system 2. Note that the buffer memory 80 may be physically integrated with the volatile memory 70. The buffer memory 80A may be physically integrated with the buffer memory 80B. The buffer memory 80 is, for example, a DRAM, a static random access memory (SRAM), an SDRAM, a ferroelectric random access memory (FeRAM), a magnetoresistive random access memory (MRAM), or the like.

The buffer memory 80A is a storage destination of the command queue 1 (standby command 1) which stores a command for the DK1 of the control system A.

The buffer memory 80B is a storage destination of the command queue 2 (standby command 2) which stores a command for the DK2 of the control system B.

The nonvolatile memory 90A and a nonvolatile memory 90B (collectively referred to as a nonvolatile memory 90 when not particularly distinguished) are semiconductor memories which record stored data even when power supply is cut off. The nonvolatile memory 90 is, for example, a NOR type or NAND type flash read only memory (flash ROM: FROM). A reordering table or the like may be stored in the nonvolatile memory 90.

The shock sensor 170 detects vibration and/or impact applied from the outside to the magnetic disk device 1 or the housing HS of the HDA 10 or the like of the magnetic disk device 1. In the case of detecting vibration and/or impact, the shock sensor 170 outputs a signal (hereinafter, may be referred to as a vibration/impact detection signal) indicating that the vibration and/or impact has been detected. The shock sensor 170 is electrically connected to, for example, the write prohibition detector 180. In the case of detecting the vibration and/or impact, the shock sensor 170 outputs a vibration/impact detection signal to the write prohibition detector 180.

The write prohibition detector 180 outputs a signal (may be referred to as a write prohibition determination execution signal) for executing the determination of prohibition of write (or write operation). In the case of receiving the vibration/impact detection signal, the write prohibition detector 180 outputs a write prohibition determination execution signal. The write prohibition detector 180 is electrically connected to, for example, the R/W channel 40. In the case of receiving the vibration/impact detection signal, the write prohibition detector 180 outputs a write prohibition determination execution signal to the R/W channel 40.

The controller communication unit 190 controls transfer of information between a plurality of control systems. The controller communication unit 190 is electrically connected to, for example, the control system A and the control system B. The controller communication unit 190 includes an actuator state communication unit 191. The actuator state communication unit 191 exchanges the actuator state between the HDC 60A and the HDC 60B.

Note that, in the configuration illustrated in FIGS. 1A and 1B, the number of functions, the configuration of functions, and the like are not intended to be particularly limited. In addition, in the present embodiment, the configurations of the control systems A and B are described, but the configurations are not particularly limited.

FIG. 3 is a block diagram illustrating a functional configuration of the servo control unit of the magnetic disk device according to the embodiment. In the servo control unit 620, by setting any one of a target position 6201, a target speed 6202, and a target acceleration 6203, a current indication value determination unit 6204 determines the current and the voltage to be applied to the actuator (the VCM, the MA, and the like). A current application unit 6205 moves the actuator AC by applying a current to the VCM, and demodulates the position information when the reproduction head reads the position information of the servo pattern on the magnetic disk DK. In addition, there may be a mechanism in which a difference between an estimated position estimated from the position, the speed, and the acceleration (current) and the demodulated position is input to a state estimation unit 6207 as in the drawing without using the position information read from the servo pattern on the magnetic disk DK as it is, and the estimated position and an estimated speed are updated in each servo sample. Note that a plant 6206 indicates a function of the voice coil motor VCM or the microactuator MA used in a general HDD.

FIG. 4 is a diagram illustrating an example of an influence on another actuator at the time of actuator activation of the magnetic disk device according to the embodiment.

In the multi-actuator magnetic disk device, when any actuator AC performs a seek operation, vibration is applied to another actuator AC. The actuator AC which performs the seek operation is referred to as an aggressor, and the actuator AC which receives the vibration of the aggressor is referred to as a victim.

A characteristic 1011 illustrates an example of a case where the aggressor operates in a high jerk seek control. A characteristic TC11 indicates an example of the time characteristic of the VCM acceleration of the aggressor-side head HD. A characteristic TC12 indicates a jerk (the derivative of acceleration) with respect to the characteristic TC11, and indicates a temporal change (da/dt) of an acceleration a. A characteristic TC13 indicates an example of the time characteristic of the head position error of the victim-side head HD when the aggressor-side head HD operates as the characteristic TC11.

A characteristic 1021 illustrates an example of a case where the aggressor operates in a low jerk seek control. A characteristic TC21 indicates an example of the time characteristic of the VCM acceleration of the aggressor-side head HD. A characteristic TC22 indicates a jerk (the derivative of acceleration) with respect to the characteristic TC21, and indicates the temporal change (da/dt) of the acceleration a. A characteristic TC23 indicates an example of the time characteristic of the head position error of the victim-side head HD when the aggressor-side head HD operates as the characteristic TC21.

TH11 and TH12 indicate thresholds for the characteristic TC12 and the characteristic TC22. TH11 is denoted by $th_{jerk}$, and TH12 is denoted by $-th_{jerk}$. The characteristic 1011 indicates that the characteristic TC12 may exceed the threshold TH11 or may fall below the threshold TH12 since the characteristic 1011 is a characteristic at the time of high jerk seek control. In addition, in the characteristic 1021, the characteristic TC22 is controlled not to exceed the threshold TH11 or fall below the threshold TH12 since the characteristic 1021 is a characteristic at the time of low jerk seek control.

TH21 and TH22 indicate thresholds for the characteristic TC13 and the characteristic TC23. TH21 is denoted by $th_{PES}$, and TH22 is denoted by $-th_{PES}$. The characteristic 1011 indicates that the characteristic TC13 may exceed the threshold TH21 or may fall below TH22 and indicates that the victim-side head position error is large since the characteristic 1011 is a characteristic at the time of high Jerk seek control. In addition, the characteristic 1021 indicates that the characteristic TC23 is controlled not to exceed the threshold TH21 or fall below TH22, and the victim-side head position error is controlled to be small since the characteristic 1021 is a characteristic at the time of low jerk seek control.

In a case where the write operation and the read operation of the data sector are performed on the victim side as described above, there is a case where a process of prohibiting the write operation occurs or an error of the read operation occurs due to the variation of the head position. Therefore, the present embodiment may have a function of suppressing the influence of the vibration interference generated between the actuators AC.

More specifically, when the aggressor-side head HD performs the seek operation, disturbance information such as position disturbance exerted on the victim-side head HD is estimated, and the estimated disturbance information is reflected in the operation of the microactuator MA of the victim-side head HD to control the victim-side head HD.

FIG. 5 is a diagram illustrating a flow of data in a function of suppressing an influence of vibration interference between actuators in the magnetic disk device according to the embodiment. This function will be described as a function of the servo control unit 620.

Here, the actuator AC1 of the control system A is described as the aggressor, and the actuator AC2 of the control system B will be described as the victim. Note that in the present embodiment, both the control system A and the control system B have the same function, and thus the aggressor and the victim may be reversed by replacing both the control system A and the control system B.

In the servo control unit 620A, when the seek operation is performed, a controller 6241A determines a VCM operation amount (control current) of the aggressor. When the VCM operation amount is input to a digital filter 6244A (transmission characteristic $F_{xact}$) of mutual interference between the actuators AC, it is possible to estimate the position disturbance exerted on the victim-side effective reproduction head HD2. The transmission characteristic $F_{xact}$ indicates a transfer characteristic of the digital filter.

Since the transmission characteristic $F_{xact}$ varies between the section radial position of the aggressor-side effective head HD1 or the disk DK1 and the section radial position of the victim-side effective head HD2 or the disk DK2, parameters for generating the transmission characteristic $F_{xact}$ may be provided in each configuration as in the digital filters 6244A and 6244B.

Specifically, the control current of the VCM is input from the controller 6241A to the VCM 6243A and is simultaneously input to the digital filter 6244A, and the output current (a current having a waveform like the TC13 in FIG. 4) of the digital filter 6244A is input to the servo control unit 620B of the control system B. In the servo control unit 620B, the output current of the digital filter 6244A is added to the control current output from the controller 6241B to be input to a microactuator MA 6242B. The servo control unit 620B adds the output current of the digital filter 6244A to the microactuator MA 6242B of the victim-side effective reproduction head to compensate for the estimated position disturbance exerted on the victim-side effective reproduction head HD and operates the victim-side effective reproduction head. As a result, the position error PES of the victim-side effective reproduction head HD with respect to the target track can be reduced.

In a case where the write operation and the read operation of the data sector of the disk DK2 are performed on the victim-side, when the head position error exceeds a head position error threshold $\pm th_{PES}$ range, a write prohibition process is performed in the write operation, and it is determined that a read error occurs in the read operation, and the read operation is stopped.

In the present embodiment, as indicated by the time characteristic TC22 in FIG. 4, the operation of the aggressor-side actuator AC1 at the time of seeking is set to a low jerk seek, and the jerk is limited within the range of $\pm th_{jerk}$. As a result, the position error of the tracking head HD2 of the victim-side actuator AC2 can be reduced to fall within the $\pm th_{PES}$ range, and the data sector can be read and written.

FIG. 6 is a diagram illustrating a reordering table according to the embodiment.

A table RTD1 indicates a reordering table for the low jerk seek, and a table RTD2 indicates a reordering table for the high jerk seek. Data STD1 indicates a seek time during the low jerk seek control, and data STD2 indicates a seek time during the high jerk seek control. The reordering tables (RTD1, RTD2) and the characteristics of the seek time (STD1, STD2) may be stored in the nonvolatile memory 90 and developed in the volatile memory 70 when the magnetic disk device 1 is activated. In addition, when selection is made by the reordering table selection unit 6131, the data may be stored in the volatile memory 70 or the buffer memory 80.

The actuator AC of the present embodiment enables at least a seek control having a low Jerk characteristic falling within the $\pm th_{jerk}$ range indicated by the characteristic TC22 of FIG. 4 and a high Jerk characteristic exceeding at least the $\pm th_{jerk}$ range indicated by the characteristic TC12 of FIG. 4. In this control, for example, when the head HD1 is controlled by the actuator AC1 of the aggressor, it is desirable to cause peak values of the VCM acceleration to match with each other (from the viewpoint of seek time) as indicated by the characteristics TC11 and TC21, regardless of whether the seek control is performed by the low jerk characteristic or the seek control is performed by the high jerk characteristic. Note that in the seek control of the characteristic TC12 and the characteristic TC22, at least one of the VCM current peak and the acceleration peak may be the same or different.

When the actuator AC2 does not perform at least a seek operation, the actuator AC1 performs a seek with a high jerk exceeding the $\pm th_{jerk}$ range. As a result, the seek time of the actuator AC1 can be shortened, a command can be accessed in a short time, and a command access performance can be improved.

On the other hand, in the case of a low jerk falling within the range of ±th$_{jerk}$, the seek time becomes long as indicated by STD1 in FIG. 6, and the command access performance (the number of commands that can be accessed per unit time) may deteriorate.

FIG. 7 is a timing chart in which the magnetic disk device according to the embodiment executes the seek operation, and illustrates an example of an overall flow from the reception of a command transmitted from the host system 2 to the seek operation. Here, it is assumed that the command transmitted from the host system 2 is a command to the disk DK1 processed by the control system A.

The host system 2 outputs a data read or write request (referred to as a command) Cmd21 to the magnetic disk device 1 (SC21). When receiving the command Cmd21 transmitted from the host system 2, the magnetic disk device 1 stores the command in a free portion of the command queue 1 (CQ1-1) on the buffer memory 80A of the magnetic disk device 1. Note that CQ1-1 to CQ1-5 in FIG. 7 indicate the same command queue 1 and indicate time transition of the state.

The command control unit 610A selects a command Cmd11 to be executed in SC101 before the SC21, and issues a seek request for accessing data on the DK1 designated by the command Cmd11 to the servo control unit 620A (SC102). The servo control unit 620A selects a pattern of a seek orbit within the predicted time among seek orbits corresponding to the disk radius movement distances of the head HD1 to the target data sector TGT according to the time (estimated time) when the head HD1 reaches the target data sector TGT of the data designated by the command request Cmd11 (SC201). As a result, writing and reading can be performed in the target data sector TGT.

The servo control unit 620A performs seek control of the head HD1 with respect to the target data sector TGT in the selected pattern of seek orbit (SC202). When the head HD1 moves to the track having the target data sector TGT by the seek control, the head HD1 issues a seek completion notification to the command control unit 610A (SC203). When the command control unit 610A waits for the rotation of the disk DK1 and detects the target data sector TGT (SC104), the command control unit controls the head amplifier IC30A to read or write the data designated by the read head RH1 or the write head WH1 (SC105).

According to the above procedure, it is possible to read or write data to the disk DK1 by the Cmd11. For example, the HDC 60A of the control system A notifies the host system 2 that the Cmd11 has been completed (SC106).

In SC201 to SC106 described above, while the head HD1 or the like is processing the Cmd11, the command control unit 610A selects a command to be executed next to the Cmd11 from the commands stored in CQ1-2 (SC103). In the SC103, the state of the other actuator AC2 is confirmed, and the jerk setting and the command Cmd12 are selected according to the state of the actuator AC2. When the processing of the Cmd11 is completed in SC106, the processing of the Cmd12 is executed in the seek operation from SC201 in the same manner as SC106 (SC107, SC204, SC205). In addition, a new command Cmd22 from the host system 2 is also stored in the free portion of the command queue 1 (CQ1-4), and the command control unit 610A selects a command to be executed next to Cmd12 from the commands stored in CQ1-5 in the same manner as SC103 (SC108). Thereafter, the magnetic disk device 1 repeats the same procedure in response to a request command from the host system 2.

Figure 8:
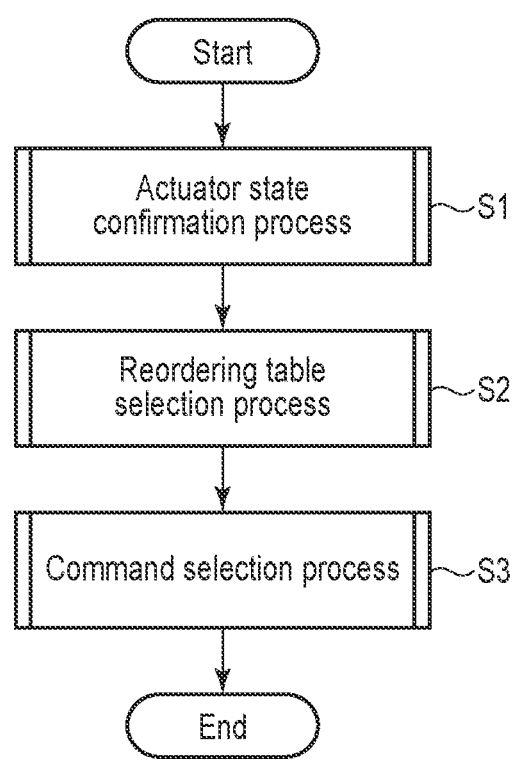
FIG. 8 is a flowchart in which the magnetic disk device according to the embodiment executes command selection.

FIG. 8 is a flowchart in which the magnetic disk device according to the embodiment executes command selection, and is a flowchart for the command control unit 610A to select a command from the command queue 1 in the command selection (reordering) in SC101, SC103, and SC108 in FIG. 7. The flowchart will be described as processing in the actuator AC1 and the control system A which controls the actuator AC1.

In the command control unit 610A, the actuator state confirmation unit 611A confirms the state of the actuator AC2 of the control system B (step S1). The reordering table selection unit 6131A selects a reordering table based on the state of the actuator AC2 confirmed in step S1 (step S2). The command selection unit 613A selects a command from the command queue 1 based on the reordering table selected in step 2 (step S3). In step S3, for example, a command having the shortest access time (seek time+rotation waiting time) in a command group is selected.

FIG. 9 is a flowchart in which the magnetic disk device according to the embodiment sets the type of the jerk seek control, and corresponds to the process of S1 of FIG. 8.

The actuator state communication unit 612A acquires a power mode which is the state information of the actuator AC2 and the number of held commands held in the command queue 2 from the actuator state communication unit 612B of the other control system B (step S101). The actuator state confirmation unit 611A confirms whether the power mode acquired in step S101 is Active (step S102). In a case where the power mode of the actuator AC2 of the control system B is not Active (No in step S102), the actuator state confirmation unit 611A sets 2 indicating the high jerk seek control in its own parameter Type_JerkSeek (step S107). A case where the power mode is not Active is, for example, a case where the power mode is Standby, Idle, or Sleep. That is, in a case where the power mode of the actuator AC2 is not Active, the HDC 60A performs seek control of the actuator AC1 with a high Jerk.

On the other hand, in a case where the power mode of the actuator AC2 of the control system B is Active (Yes in step S102), the actuator state confirmation unit 611A confirms the number of held commands of the command queue 2 acquired in step S101 (step S103).

In a case where the number of commands in the command queue 2 is 0 (No in step S103), the actuator state confirmation unit 611A sets 2 indicating the high jerk seek control in its own parameter Type_JerkSeek (step S107). In a case where the number of commands of the actuator AC2 is 1 or more (Yes in step S103), the actuator state confirmation unit 611A confirms Type_JerkSeek set in the actuator AC2 (step S104).

In a case where Type_JerkSeek=2 (Yes in step S104), the actuator state confirmation unit 611A sets 0 indicating the low jerk seek control to its own parameter Type_JerkSeek (step S105). In addition, in a case where Type_JerkSeek is other than 2 (No in step S104), the actuator state confirmation unit 611A sets 1 indicating the high jerk seek control in its own parameter Type_JerkSeek (step S106).

The above setting procedure of Type_JerkSeek can also be summarized as follows. That is, in a case where the power mode of the actuator AC2 of the other (control system B) is Standby or Idle, the high Jerk seek control (Type_JerkSeek=2) is set. In a case where the power mode of the other actuator AC2 is Active and the number of commands of the command queue 2 related to the other actuator AC2 is 0, the high Jerk seek control (Type_JerkSeek=2) is set. In a case where the power mode of the other actuator AC2 is Active, the number of commands of the command queue 2 related to the other actuator AC2 is 1 or more, and Type_JerkSeek of the other actuator AC2 is 2, the low Jerk seek control (Type_JerkSeek=0) is set. In a case where the power mode of the other actuator AC2 is Active, the number of commands of the command queue 2 related to the other actuator AC2 is 1 or more, and Type_JerkSeek of the other actuator AC2 is other than 2, the low Jerk seek control (Type_JerkSeek=1) is set.

FIG. 10 is a flowchart in which the magnetic disk device according to the embodiment sets the type of the reordering table, and corresponds to the process of S2 of FIG. 8.

The reordering table selection unit 6131A confirms Type_JerkSeek set by the actuator state confirmation unit 611A in the flow of FIG. 9 (step S201). In a case where Type_JerkSeek is a low Jerk seek of 0 or 1 ('0, 1' in step S201), the reordering table selection unit 6131A acquires a reordering table for the low Jerk seek from the volatile memory 70A and sets the reordering table in the servo control unit 620A (step S202). In a case where Type_JerkSeek is a high jerk seek of 2 ('2' in step S201), the reordering table for the high jerk seek is acquired from the volatile memory 70A and set in the servo control unit 620A (step S203).

Figure 11:
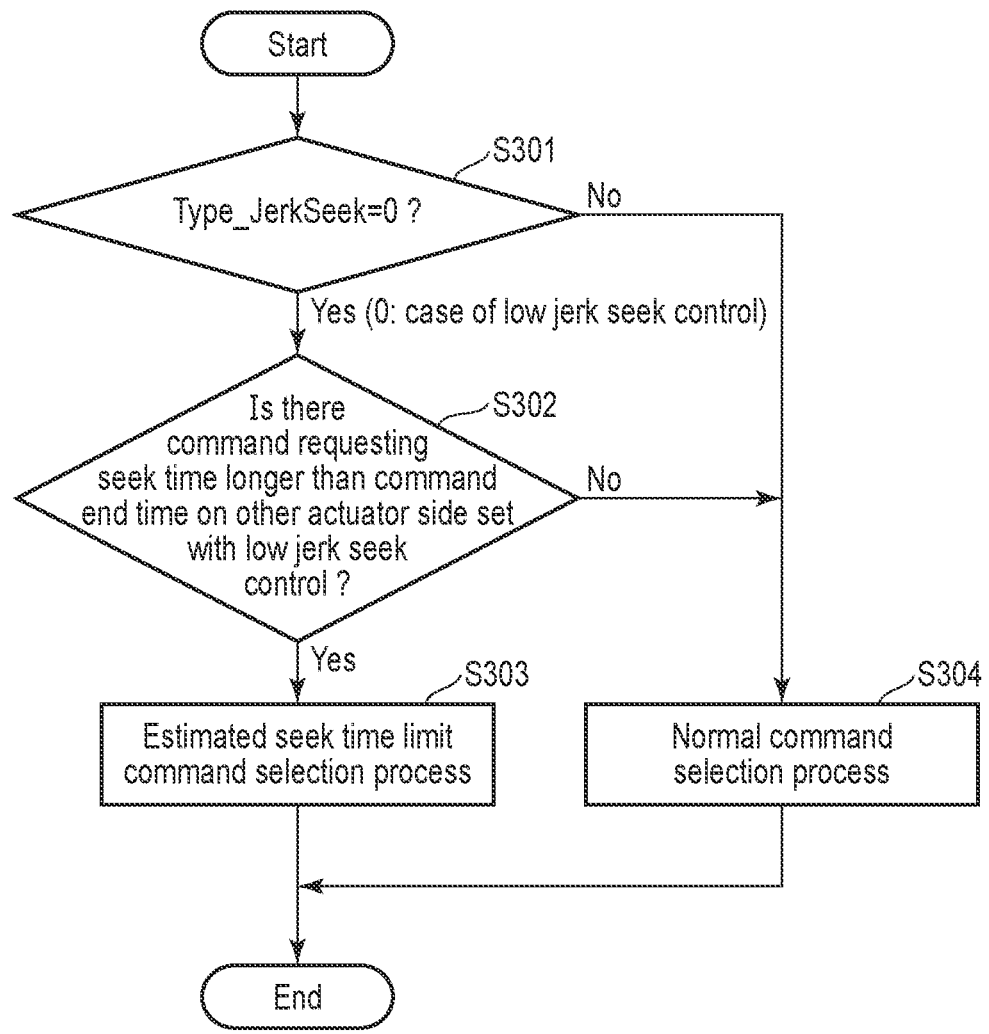
FIG. 11 is a flowchart in which the magnetic disk device according to the embodiment executes the command selection.

FIG. 11 is a flowchart in which the magnetic disk device according to the embodiment executes the command selection, and corresponds to the process of S3 of FIG. 8.

The command selection unit 613A confirms Type_JerkSeek set by the actuator state confirmation unit 611A in the flow of FIG. 9 (step S301). In a case where Type_JerkSeek set by the actuator state confirmation unit 611A is not 0 (No in step S301), the command selection unit 613A performs a normal command selection process (step S304). That is, in step S304, the command selection unit 613A selects a command with a short access time from a command group in the command queue 1 of the control system A as in the related art. The servo control unit 620A processes the command selected in step S304. More specifically, in the servo control unit 620A, the low jerk seek control unit 6221A performs seek control of the head HD1 with the low jerk seek pattern in the case of Type_JerkSeek=1, and the high jerk seek control unit 6221A performs seek control of the head HD1 with the high jerk seek pattern in the case of Type_JerkSeek=2.

In step S301, in a case where Type_JerkSeek is 0 (0 indicates low jerk seek control. However, the other actuator AC2 is set to the high jerk seek control) (Yes in step S301), the command selection unit 613A confirms the end time of the command currently being executed on the actuator AC2 side and the access time of each command in the command queue 1 of the control system A (step S302).

In step S302, in a case where there is no command in the command queue 1 that requires a seek time longer than the end time of the command being executed on the other actuator AC2 side (No in step S302), the command selection unit 613A performs the normal command selection process (step S304). That is, a command with a short access time is selected from the command group in the command queue 1 for the control system A as in the related art (step S304). In step S304, at this time, the servo control unit 620A desirably performs a seek with the JIT seek in a time obtained by adding a rotation time of one turn. Accordingly, power consumption due to the seek can be reduced.

In step S302, in a case where the command that requires a seek time longer than the end time of the command on the other actuator AC2 side is in the command queue 1 (Yes in step S302), the command selection unit 613A selects a command with a short access time from the commands in the command queue 1 that requires a seek time longer than the end time of the command on the other actuator AC2 side (step S303). In step S303, at this time, the servo control unit 620A desirably performs a seek with the JIT seek. Accordingly, power consumption due to the seek can be reduced.

The above procedure can be summarized as follows. There is a problem that the control system A cannot access data due to the influence of vibration by the control system B while the actuator AC2 of the control system B performs the high jerk seek operation. In order to avoid this problem, the control system A performs control so that the head HD1 accesses data (data read/write process) after the high jerk seek operation by the control system B ends. For example, in the processing of the command selected from the command queue 1 in the normal command selection process (corresponding to step S304), the control system A may execute the read/write process operation by the head HD1 after waiting for one rotation of the disk DK1 after moving the head HD1 to the target track by the seek control. Note that in a case where the high Jerk seek operation by the control system B is not ended even after waiting for one rotation of the disk DK1, the control system A may perform the data read/write process after waiting for a further rotation time of the disk DK1.

In steps S303 and S304, as a method of selecting a command with a short access time from the command group in the command queue 1 for the control system A, a method may be adopted which selects a command of a first destination with a short access time in the path in consideration of not only the first destination but also following second destination and third destination and the like.

The command selection unit 613A executes the command selected by the above flow. The servo control unit 620A controls the driver IC 20, the actuator AC1, and the like based on the command selected by the command selection unit 613A.

Figure 12:
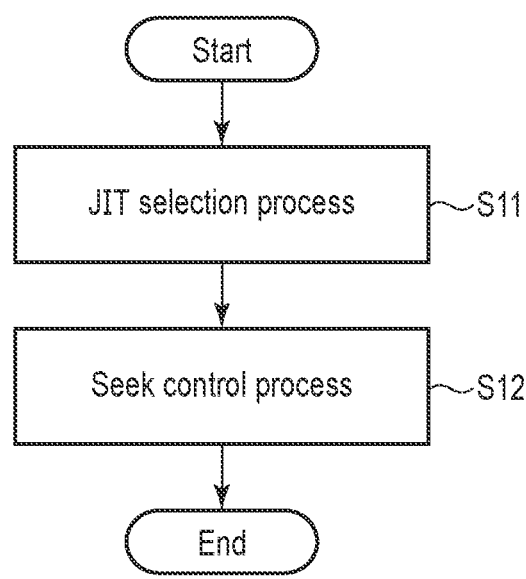
FIG. 12 is a flowchart in which the magnetic disk device according to the embodiment executes seek control.

FIG. 12 is a flowchart in which the magnetic disk device according to the embodiment executes the seek control, and illustrates processing of the command selected in step S303 of FIG. 11. The seek control is control to move the head HD to the track (target track) of the target data sector designated by the command.

The JIT seek control unit 620A of the servo control unit 6223A selects a pattern of a seek orbit in time for the data sector (target data sector TGT) (step S11). In the pattern selection of the seek orbit, for example, in the case of the same access performance, it is preferable that the power consumption by the seek operation is low, and in step S11, the JIT seek control unit 6223A selects, for example, the pattern of the seek orbit with the lowest power consumption (also referred to as the JIT seek).

Figure 13A:
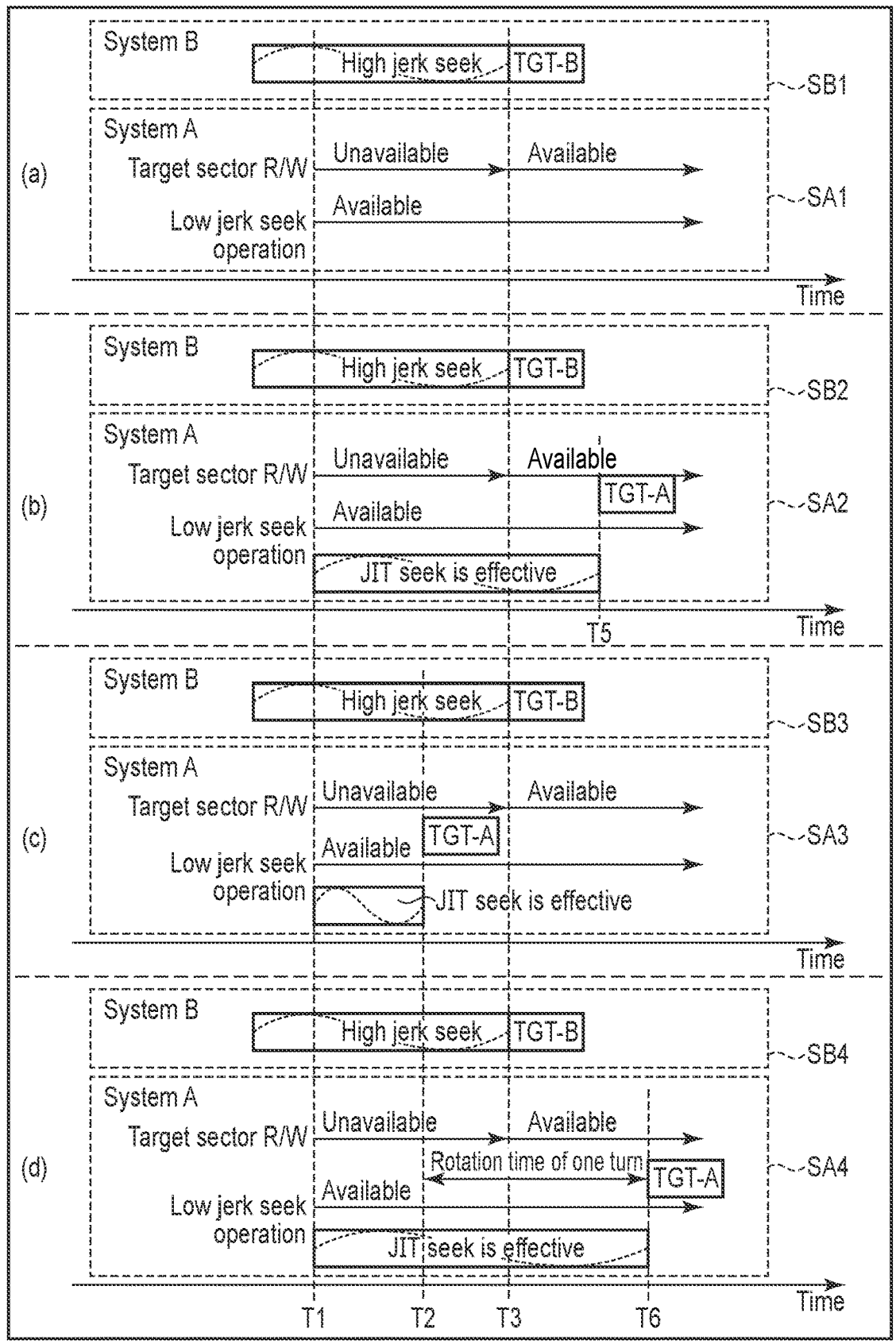
FIG. 13A is a diagram illustrating timings at which two control systems of the magnetic disk device according to the embodiment execute the seek control.

FIG. 13A is a diagram illustrating timings at which two control systems of the magnetic disk device according to the embodiment execute the seek control.

FIG. 13A part (a) illustrates a state SA1 of the control system A and a state SB1 of the control system B on the same time axis, and corresponds to the states of the control systems A and B in Yes in S301 of FIG. 11. In the control system B in the state SB1 of the control system B, it is indicated that a command (referred to as a command B) for a target data sector TGT-B is being processed, and the control system B is in the middle of seek control in the high jerk seek at a time T1. In the control system A in the state SA1 of the control system A, it is indicated that while the control system B performs the seek control in the high jerk seek, the seek control by the low jerk can be performed on the actuator AC1, but the read/write control for the target data sector is not possible. The control system B ends the high jerk seek control at a time T3, and the control system A can perform read/write control on the target data sector.

FIG. 13A part (b) illustrates a state SA2 of the control system A and a state SB2 of the control system B on the same time axis, and corresponds to the states of the control systems A and B in Yes in step S302 of FIG. 11. At the time T1 of the state SA2 of the control system A, the command selection unit 613A compares an estimated seek control end time T5 for a target data sector TGT-A of the command (referred to as a command A) to be processed by the control system A with an estimated time T3 at which the seek control by the high jerk seek control of the control system B is completed, and the command selection unit 613A of the control system A selects the JIT seek for the seek control for the target data sector TGT-A.

FIG. 13A part (c) illustrates a state SA3 of the control system A and a state SB3 of the control system B on the same time axis, and corresponds to the states of the control systems A and B in a case where the command is selected in S304 after No in step S302 of FIG. 11 and the seek operation is performed with the waveform of the corresponding JIT seek pattern. At the time T1 of the state SA3 of the control system A, the command selection unit 613A compares an estimated seek control end time T2 for the target data sector TGT-A of the command (referred to as the command A) to be processed by the control system A with the estimated time T3 at which the seek control by the high jerk seek control of the control system B is completed, and the command selection unit 613A of the control system A selects the JIT seek for the seek control for the target data sector TGT-A. However, in the case of FIG. 13A part (c), the start time T2 of the read/write control to the target data sector TGT-A by the control system A temporally overlaps the high jerk seek control of the control system B, and there is a large possibility that an error occurs in the read/write control to the TGT-A. In order to avoid this error, for example, the control system A may execute the read/write control to the target data sector TGT-A after waiting for the end of the high jerk seek control of the control system B.

FIG. 13A part (d) corresponds to the states of the control systems A and B in the case of performing the read/write control to the target data sector TGT-A after the control system A waits for the end of the high jerk seek control of the control system B in the case of FIG. 13A part (c). FIG. 13A part (d) illustrates an example in which the control system A waits for one cycle of the rotation time of the disk. The control system A starts the read/write control of the target data sector TGT-A at a time T6 when one cycle of the rotation time of the disk has further elapsed from the start time T2 of the first read/write control of the target data sector TGT-A. The control system A selects the JIT seek in which the seek control to the target data sector TGT-A ends at the time T6. As a result, the control system A can execute the read/write control to the target data sector TGT-A without being affected by the high jerk seek control of the control system B.

FIG. 13B is a diagram illustrating a relationship between operation states of two control systems of the magnetic disk device according to the embodiment.

The tracking control is control for positioning the head HD in the target track, and may be considered as a state when the seek (including the high jerk seek, the low jerk seek, and the like) is not being executed. For example, in FIG. 13A, the portion (data read drive time) of the TGT (TGT-B, TGT-A), the time after the portion (data read drive time) of the TGT (TGT-B, TGT-A), and the time before the start of the seek indicate the state of "tracking control". Using the operation parameter Type_JerkSeek set in FIG. 9, the actuator block 100 or the actuator AC may have, for example, Type_JerkSeek=−1 in the state of tracking control. In addition, as a state in which the head HD is reading or writing data, another value may be assigned to Type_Jerk-Seek.

A state STT1 indicates an operation state permitted to one actuator block (referred to as the actuator block 100A) when the other actuator block (referred to as the actuator block 100B) is executing the seek in the high jerk seek control. That is, when the actuator block 100B executes the seek in the high jerk seek control, the actuator block 100A performs control such that the tracking control is possible, the data read/write of the head HD1 is not possible, the low jerk seek control is possible, and the high jerk seek control is not possible.

A state STT2 indicates that the tracking control, the data read/write of the head HD1, the low jerk seek control, and the high jerk seek control are possible when the actuator block 100B is not executing the seek in the high jerk seek control.

Figure 14:
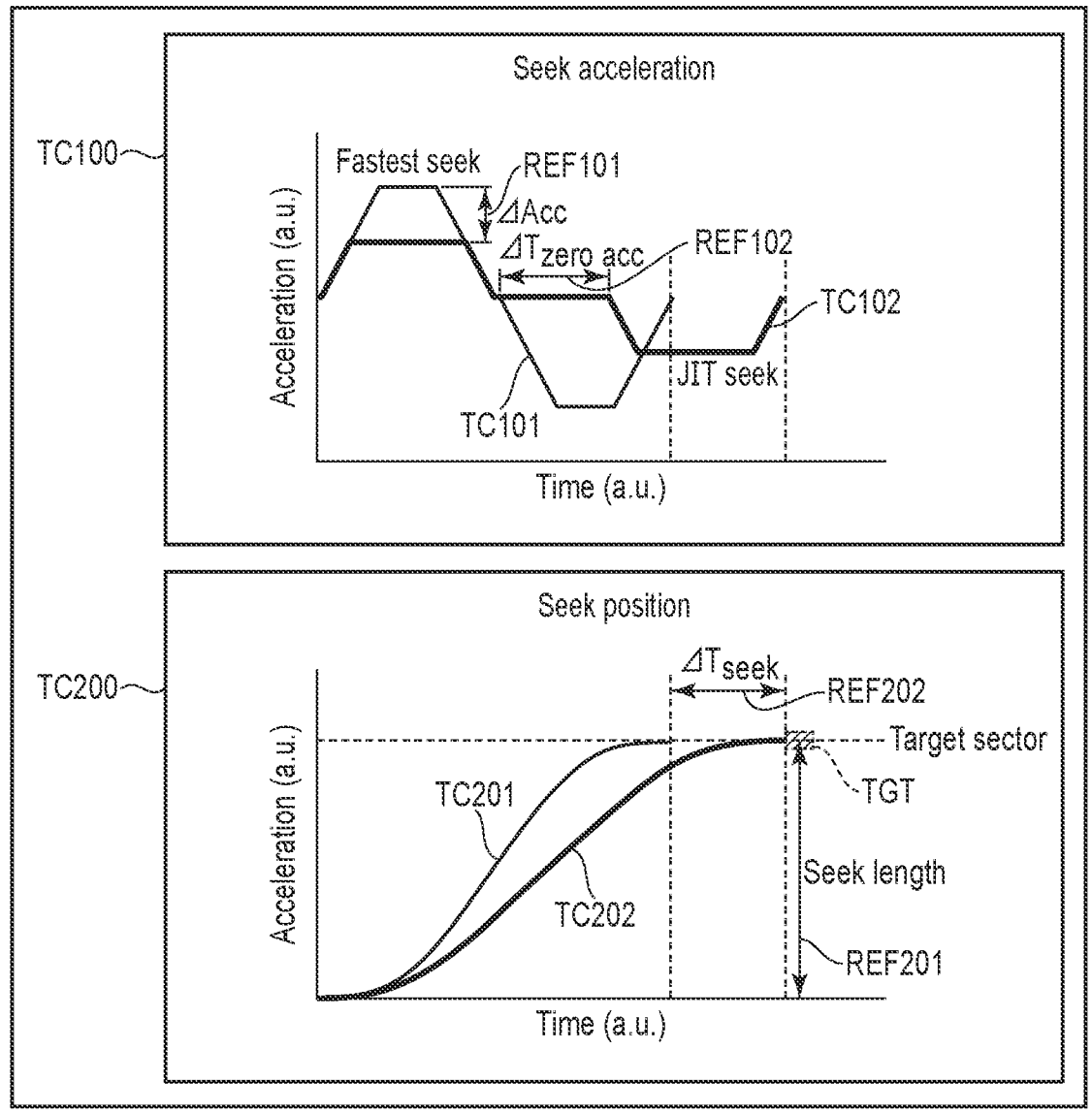
FIG. 14 is a diagram illustrating an example of relationships of an acceleration and a position of seek control in the magnetic disk device according to the embodiment.

FIG. 14 is a diagram illustrating an example of relationships of an acceleration and a position of the seek control in the magnetic disk device according to the embodiment.

A TC100 indicates an example of the time characteristic (time to seek acceleration) of the seek acceleration of the head HD1, a TC200 indicates an example of the time characteristic (time to seek position) of the seek position of the head HD1, the characteristics TC101 and TC201 indicate characteristics in the case of the fastest seek, and the characteristics TC102 and TC202 indicate characteristics in the case of the JIT seek. A target data sector TGT is assumed to be one sector on one track on the disk DK1.

The fastest seek is the fastest seek pattern for causing the head HD1 to reach the target data sector TGT, and is, for example, a case where the head HD1 is moved by the high jerk seek control as in TC11 illustrated in FIG. 4.

The JIT seek is a seek in which control is performed with the pattern of the seek orbit optimized to reduce power consumption of the magnetic disk device 1 by the seek control. More specifically, the JIT seek is the pattern of the seek orbit optimized to reduce power consumption or the like among the seek patterns in which the seek is completed immediately before the target data sector.

In a case where the actuator state confirmation unit 611A performs the seek with the characteristic TC101 of the fastest seek pattern that meets the Type_JerkSeek condition set in the flow of FIG. 9, the head reaches the track (target track) having the target data sector TGT earlier by (delta) $T_{seek}$ time (REF202). In step S11 of FIG. 12, the seek pattern in which the seek time corresponding to the (delta) $T_{seek}$ time is long, that is, the JIT seek is selected. For example, in the characteristic TC102 of the JIT seek in FIG. 14, the acceleration level in the acceleration and deceleration section is lowered than the characteristic TC101 of the fastest seek pattern (the voltage level applied to the VCM is lowered), and adjustment is made by a length of a zero acceleration section (it is sufficient if the acceleration is near zero) (also referred to as a constant speed section) to adjust a seek distance to the target track.

Reducing the acceleration level has an effect of reducing a power consumption P of the disk device 1. The power consumption P is determined by a current $I_{vcm}$ flowing through the VCM and a circuit resistance R including the VCM, and in a case where the acceleration level is lowered, the current $I_{vcm}$ flowing through the VCM is lowered, so that the power consumption P is lowered.

$$P = R \times I_{vcm}^2$$

Note that in the above example, the power consumption is decreased by lowering the acceleration level, but the acceleration section and the deceleration section may be shortened, and adjustment may be made by the length of the zero acceleration section (it is sufficient if the acceleration is near zero) (also referred to as the constant speed section) to reduce the power consumption.

In the adjustment of the seek control of the characteristic TC102, adjustment is performed by any combination of a time or acceleration level in the acceleration section, a time or acceleration level in the deceleration section, and a time in the constant speed section of the actuator AC1.

After selecting the pattern of the seek orbit such as an acceleration characteristic T101 in step S11 of FIG. 12, the seek control unit 622A executes the seek control according to the selected seek orbit pattern (seek control setting). More specifically, the seek control unit 622A controls the actuator AC1 from the low Jerk seek control unit 6221A or the JIT seek control unit 6223A in accordance with its own parameter Type_JerkSeek set by the actuator state confirmation unit 611A, for example, when Type_JerkSeek=0.

According to the above procedure, the actuator AC1 can be operated in consideration of the state of the other actuator AC2, the seek time can be shortened so that the command can be accessed in a short time, and the command access performance can be improved.

(Modification)

In the embodiment, the example of the magnetic disk including two control systems for controlling two disks DK and actuators AC has been described, but the number of disks DK, the actuators AC, and the control systems may be two or more. For example, the spindle 12 may be provided with two or more disks DK, and each may be provided with the actuator block 100. In addition, there may be two or more spindles 12, each of which may be provided with two or more disks DK and the actuator block 100 for controlling the disks, or may be provided with two or more control systems. In a case where the magnetic disk device 1 includes two or more actuators AC (or actuator block 100), for example, "the other actuator AC (or the actuator block 100)" in steps S102, S103, and S104 of FIG. 9, FIG. 13B, or the like may be a plurality of actuators AC (or actuator blocks 100) other than the actuator AC (or actuator block 100) of interest.

Figure 15:
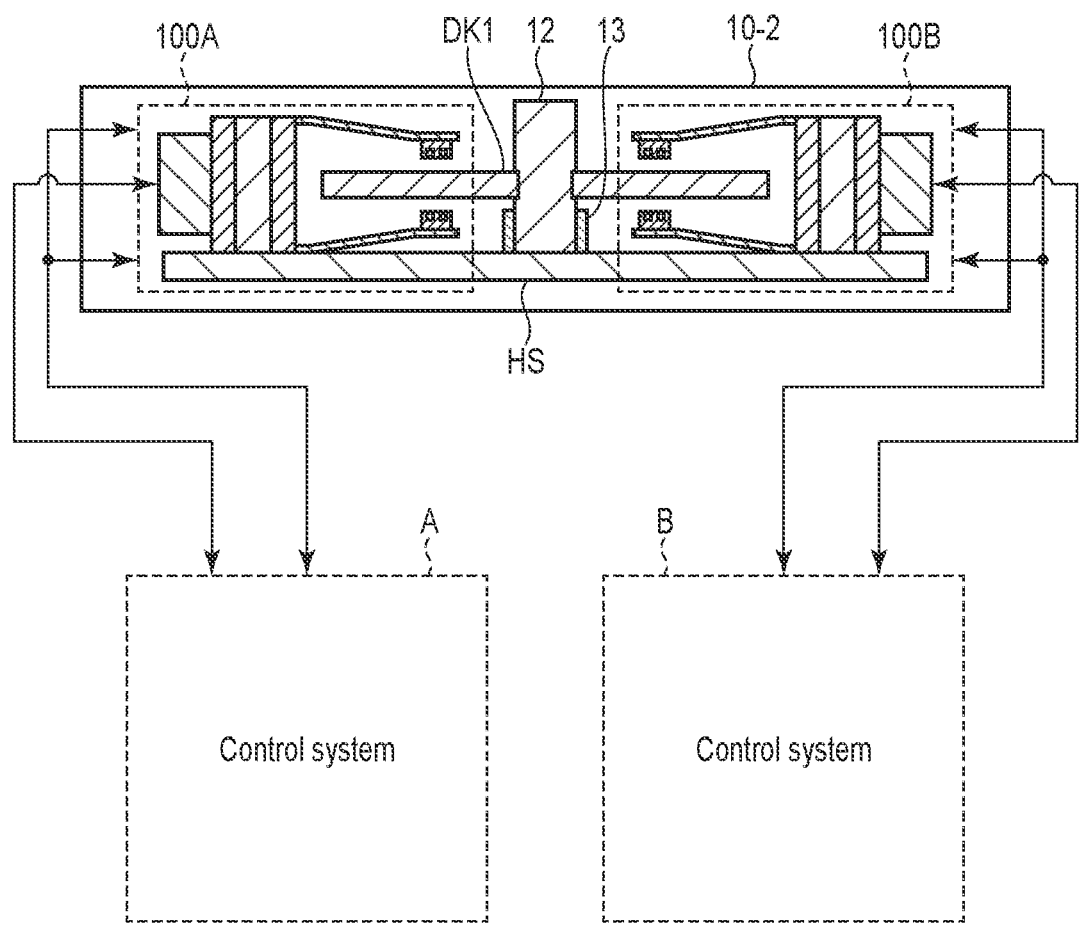
FIG. 15 is a configuration diagram of a magnetic disk device according to a modification.

FIG. 15 is a configuration diagram of a magnetic disk device according to a modification.

The magnetic disk device of the present modification is similar to the magnetic disk device 1 of FIG. 1 except that the HDA 10 is an HDA 10-2. The HDA 10-2 is an example in which two actuator blocks 100 (similar to FIG. 2A) are attached in the horizontal direction (the case of the HDA 10 is defined as a vertical direction) of one spindle (SPM) 12. Unlike the HDA 10 of FIG. 1, in the HDA 10-2, the actuator blocks 100A and 100B are attached to two coaxial BRs for the VCM, respectively.

In the magnetic disk device of the present modification, when the actuator blocks 100A and 100B are controlled by two control systems A and B (similar to FIG. 1) in the same manner as the control illustrated in the embodiment, respectively, it is possible to perform command access in consideration of the influence of the microactuator.

Features described in the present embodiment are extracted as follows.

(A-1) A magnetic disk device 1 which includes two or more independently drivable actuator blocks 100 and performs seek control with a low jerk in with a jerk that is a derivative of acceleration is limited, in which
  in a state where an actuator block 100B is not accessing a data sector of a disk, an actuator block 100A accesses the data sector of the disk by seek control with a high Jerk.

(A-2) The magnetic disk device according to (A-1), in which
  a state where the actuator block 100B is not accessing the data sector of the disk is a case where a power mode of the actuator block 100B is not Active or a state where a command queue 2 in which a command that is an access request from a host system 2 to the disk is stored is in an empty state.

(A-3) The magnetic disk device according to (A-1), in which
  a nonvolatile memory holds a low Jerk seek control parameter for executing the jerk-limited seek control with the low jerk and a high Jerk seek control parameter for executing the seek control with the high Jerk.

(A-4) The magnetic disk device according to (A-3), in which
  the low Jerk seek control parameter and the high Jerk seek control parameter stored in the nonvolatile memory are developed in a volatile memory at a time of activation.

(A-5) The magnetic disk device according to (A-1), in which
  a correspondence table of a seek time with respect to a seek distance for performing command reordering is provided in each of the jerk-limited seek control with the low jerk and the seek control with the high jerk.

(A-6) The magnetic disk device according to (A-5), in which
  the correspondence table is switched when the jerk-limited seek control with the low jerk is switched to the seek control with the high jerk.

(A-7) The magnetic disk device according to any one of (A-1) to (A-6), in which
  when the actuator block 100A performs seek control while the actuator block 100B is performing the seek control with the high jerk, in a case where one or more commands which are accessible to a data sector controlled by the actuator block 100A at a time later than a seek end time of the actuator block 100B are in a command queue 1, a command to be accessed next is selected from the commands in the command queue 1.

(A-8) The magnetic disk device according to any one of (A-1) to (A-7), in which
  when the actuator block 100A performs seek control while the actuator block 100B is performing the seek control with the high jerk, in a case where there is no command in the command queue 1 which is accessible to the data sector at the time later than the seek end time of the actuator block 100B, the actuator block 100A selects a command to be accessed next from the command queue 1, adds a one-turn rotation time of the disk after the seek end time of the actuator block 100B, and accesses the command.

(A-9) The magnetic disk device according to any one of (A-1) to (A-8), in which
  after a target data sector is determined in the seek control of the actuator block 100A, the seek control of the actuator block 100A is adjusted such that the seek of the actuator block 100A ends immediately before a time of accessing the target data sector.

(A-10) The magnetic disk device according to (A-9), in which
in adjustment of the seek control of the actuator block 100, the adjustment is performed by any combination of a time or an acceleration level in an acceleration section of an actuator AC, a time or an acceleration level in a deceleration section, and a time in a constant speed section.

(A-11) The magnetic disk device according to any one of (A-1) to (A-10), in which
in the seek control with the high Jerk and the seek control with the low Jerk by the actuator block 100, peak levels of either acceleration or current in the seek controls are matched with each other.

By adopting the above (A-1), in a state where a certain actuator block is not accessing a data sector, a seek which allows the target data sector to be reached more quickly can be performed.

By adopting the above (A-2), the (A-1) can be performed when the power mode of the HDD is Idle or Standby or when the command queue to the HDD requested from the host is in an empty state.

By adopting the above (A-3), it is possible to perform the jerk-limited seek control with the low jerk and the seek control with the high Jerk.

By adopting the above (A-4), in a configuration in which the overhead due to the processing time on the FW is small, it is possible to perform the jerk-limited seek control with the low jerk and the seek control with the high jerk.

By adopting the above (A-5), the command control side can perform the command reordering corresponding to the seek control of the high jerk.

By adopting the above (A-6), the command control side can perform the command reordering corresponding to the seek control of the high jerk. In a case where this is not adopted, even when the seek control with the high jerk is performed, rotation waiting occurs and an access performance is not improved.

By adopting the above (A-7), it is possible to adjust a timing such that writing and reading to and from the data sector are not performed at the time when interference vibration due to the high jerk seek of a certain actuator block is applied.

By adopting the above (A-8), it is possible to adjust the timing such that writing and reading to and from the data sector are not performed at the time when interference vibration due to the high jerk seek of a certain actuator block is applied.

By adopting the above (A-9), it is possible to reduce power consumption in the same access performance.

By adopting the above (A-10), it is possible to perform seek control adjustment in which the seek is ended immediately before the time of accessing the target data sector.

By adopting the above (A-11), even when the current peak or the acceleration peak is the same, the seek time can be changed by changing the jerk.

According to at least one embodiment and modification described above, it is possible to provide the magnetic disk device which improves the performance of a multi-actuator.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. In addition, the processes illustrated in the flowcharts, the sequence charts, and the like may be realized by software (programs and the like) operated by hardware such as an IC chip and a digital signal processing processor (DSP), a computer including a microcomputer, or the like, or a combination of the hardware and the software. In addition, the device of the present invention is also applied to a case where the claims are expressed as a control logic, a case where the claims are expressed as a program including an instruction for executing a computer, and a case where the claims are expressed as a computer-readable recording medium describing the instruction. In addition, names and terms used are not limited, and even other expressions are included in the present invention as long as they have substantially the same content and the same purpose.

What is claimed is:

1. A magnetic disk device which includes two or more independently drivable actuator blocks and performs seek control with a low jerk in which a jerk that is a derivative of acceleration is limited, wherein
in a state where a first actuator block is not accessing a data sector of a disk, a second actuator block that is not the first actuator block accesses the data sector of the disk by seek control with a high Jerk.

2. The magnetic disk device according to claim 1, wherein when a power mode of the first actuator block is not Active or a command queue storing a first command that is a disk access request from a host to the first actuator block is in an empty state, it is determined that the first actuator block is in a state of not accessing the data sector.

3. The magnetic disk device according to claim 1, wherein a nonvolatile memory holds a low jerk seek control parameter for executing the jerk-limited seek control with the low jerk and a high jerk seek control parameter for executing the seek control with the high jerk.

4. The magnetic disk device according to claim 3, wherein the low Jerk seek control parameter and the high Jerk seek control parameter stored in the nonvolatile memory are developed in a volatile memory at a time of activation.

5. The magnetic disk device according to claim 1, wherein a correspondence table of a seek time with respect to a seek distance for performing command reordering is provided in each of the jerk-limited seek control with the low jerk and the seek control with the high jerk.

6. The magnetic disk device according to claim 5, wherein the correspondence table is switched when the jerk-limited seek control with the low jerk is switched to the seek control with the high jerk.

7. The magnetic disk device according to claim 1, wherein when a fourth actuator block other than a third actuator block performs seek control while the third actuator block is performing the seek control with the high jerk, in a case where there are one or more fourth commands which are accessible to a data sector controlled by the fourth actuator block at a time later than a seek end time of the third actuator block, a command to be accessed next is selected from the fourth commands.

8. The magnetic disk device according to claim 1, wherein when a sixth actuator block other than a fifth actuator block performs seek control while the fifth actuator block is performing the seek control with the high jerk, in a case where there is no command which is accessible by the fifth actuator block in a data sector at a time later than a seek end time of the fifth actuator block, a command to be accessed next is selected from a command group, a rotation time of one turn is added, and the command is accessed at the time later than the seek end time of the fifth actuator block.

9. The magnetic disk device according to claim 1, wherein after a target data sector is determined in seek control of a seventh actuator block, the seek control of the seventh actuator block is adjusted such that the seek of the seventh actuator block ends immediately before a time of accessing the target data sector.

10. The magnetic disk device according to claim 9, wherein
in adjustment of the seek control of the seventh actuator block, the adjustment is performed by any combination of a time or an acceleration level in an acceleration section of the actuator, a time or an acceleration level in a deceleration section, and a time in a constant speed section.

11. The magnetic disk device according to claim 1, wherein
in the seek control, in a case where the seek control with the high jerk and the seek control with the low jerk are switched, a peak level of either acceleration or current is matched in operation characteristics of the seek controls.

\* \* \* \* \*